US012719347B2

(12) United States Patent
Jiao et al.

(10) Patent No.: US 12,719,347 B2
(45) Date of Patent: Aug. 25, 2026

(54) SWITCH MODE POWER SUPPLY SYSTEM WITH ZERO VOLTAGE SWITCHING

(71) Applicant: TEXAS INSTRUMENTS INCORPORATED, Dallas, TX (US)

(72) Inventors: Yang Jiao, Dallas, TX (US); Johan Strydom, Santa Clara, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 102 days.

(21) Appl. No.: 17/702,682

(22) Filed: Mar. 23, 2022

(65) Prior Publication Data

US 2023/0122886 A1 Apr. 20, 2023

Related U.S. Application Data

(60) Provisional application No. 63/257,511, filed on Oct. 19, 2021.

(51) Int. Cl.
*H02M 1/00* (2007.01)
*H02J 7/02* (2016.01)
(Continued)

(52) U.S. Cl.
CPC ............. *H02M 1/0058* (2021.05); *H02J 7/02* (2013.01); *H02M 1/0022* (2021.05);
(Continued)

(58) Field of Classification Search
CPC ... H02M 1/0058; H02M 1/0022; H02M 3/158
See application file for complete search history.

(56) References Cited

U.S. PATENT DOCUMENTS 6,570,366 B1 5/2003 Lin
7,567,134 B2 * 7/2009 Cohen ................. H03D 13/003 331/2

(Continued)

FOREIGN PATENT DOCUMENTS

CN 101552546 A * 10/2009
CN 101860194 A * 10/2010

(Continued)

OTHER PUBLICATIONS

Biela et al., Optimal Design of a 5KW/dm3 / 98.3% Efficient TCM Resonant Transition Single-Phase PFC Rectifier, The 2010 International Power Electronics Conference -Ecce Asia-, 2010, pp. 1709-1716, doi: 10.1109/IPEC.2010.5542042.

(Continued)

*Primary Examiner* — Sisay G Tiku
(74) *Attorney, Agent, or Firm* — Zhenhai Fu; Frank D. Cimino

(57) ABSTRACT

In one example, a controller circuit is configured to: receive a first measurement signal representing a power converter input voltage; receive a second measurement signal representing a power converter output voltage; receive an indication of whether a voltage across a switch is positive during a state change of the switch; based on the first and second measurement signals and the indication, determine: a charging interval; a first dead time interval after the charging interval; a discharging interval; and a second dead time interval after the discharging interval; and provide a first control signal at the first control output, and provide a second control signal at the second control output, in which the states of the first and second control signals vary across the charging interval, the first and second dead time intervals, and the discharging the interval.

23 Claims, 16 Drawing Sheets

(51) Int. Cl.
*H02M 1/42* (2007.01)
*H02M 3/158* (2006.01)

(52) U.S. Cl.
CPC ......... *H02M 1/4225* (2013.01); *H02M 3/158* (2013.01); *H02J 2207/20* (2020.01)

(56) References Cited

U.S. PATENT DOCUMENTS

| | | | | |
|---|---|---|---|---|
| 7,706,151 | B2 * | 4/2010 | Neidorff | H02M 1/4225 363/9 |
| 8,842,450 | B2 * | 9/2014 | Jungreis | H02M 3/33571 363/21.03 |
| 9,270,183 | B2 * | 2/2016 | Knoedgen | H02M 1/4208 |
| 10,241,322 | B2 * | 3/2019 | Gritti | G02B 26/0833 |
| 10,879,813 | B2 * | 12/2020 | Askarianabyaneh | H02M 3/33507 |
| 11,056,590 | B1 * | 7/2021 | Elhami Khorasani | H01L 29/1033 |
| 11,770,073 | B2 * | 9/2023 | Wu | H02M 3/1584 713/320 |
| 2009/0091957 | A1 * | 4/2009 | Orr | H02M 3/3376 363/79 |
| 2010/0072968 | A1 * | 3/2010 | Bianco | H02M 3/156 323/284 |
| 2012/0126765 | A1 * | 5/2012 | Stone | H02M 3/1588 323/283 |
| 2012/0212986 | A1 | 8/2012 | Minami | |
| 2014/0071724 | A1 | 3/2014 | Chiba | |
| 2016/0233760 | A1 * | 8/2016 | Bianco | H02M 1/44 |
| 2016/0241132 | A1 | 8/2016 | Lin | |
| 2017/0005565 | A1 | 1/2017 | Bai | |
| 2018/0287481 | A1 | 10/2018 | Liu | |
| 2019/0013731 | A1 * | 1/2019 | Gritti | H02M 3/157 |
| 2020/0059151 | A1 * | 2/2020 | Oh | H02M 1/126 |
| 2020/0059152 | A1 * | 2/2020 | Liu | H02M 3/1588 |
| 2020/0112243 | A1 * | 4/2020 | Dusmez | H02M 1/083 |
| 2020/0313570 | A1 | 10/2020 | Hall | |
| 2020/0343816 | A1 * | 10/2020 | Wu | H02M 1/083 |
| 2021/0135666 | A1 * | 5/2021 | Wang | B60L 58/10 |
| 2022/0329166 | A1 * | 10/2022 | Ikarashi | H02M 1/342 |
| 2023/0275521 | A1 * | 8/2023 | Song | H02M 3/1566 363/21.14 |
| 2023/0314484 | A1 * | 10/2023 | Scoones | H02M 3/07 324/140 R |
| 2024/0322667 | A1 | 9/2024 | Chen | |

FOREIGN PATENT DOCUMENTS

| | | | | |
|---|---|---|---|---|
| CN | 112701902 | A * | 4/2021 | |
| CN | 115411927 | A * | 11/2022 | H02M 1/0095 |
| CN | 115987063 | A * | 4/2023 | |
| CN | 116131596 | A * | 5/2023 | |
| CN | 117134586 | A * | 11/2023 | |
| GB | 2513322 | A * | 10/2014 | |
| TW | 201526699 | A * | 7/2015 | |
| TW | 202133537 | A * | 9/2021 | |
| WO | WO-2012147254 | A1 * | 11/2012 | |
| WO | WO-2023163876 | A1 * | 8/2023 | |
| WO | WO-2024049730 | A1 * | 3/2024 | H02M 1/0058 |

OTHER PUBLICATIONS

International Searching Authority, International Search Report, mailed Nov. 28, 2023, 4 pages.

International Searching Authority, Written Opinion mailed Nov. 28, 2023, 7 pages.

Jiao et al., Switch Mode Power Supply System, U.S. Appl. No. 17/702,682, filed Mar. 23, 2022, 62 pages.

Neumayr et al., Novel efficiency-Optimal Frequency Modulation for high power density DC/AC converter systems, 2017 IEEE 3rd International Future Energy Electronics Conference and ECCE Asia (IFEEC 2017—ECCE Asia), 2017, pp. 834-839, doi: 10.1109/IFEEC.2017.7992148.

Sankaranarayanan et al., "Online Efficiency Optimization of a Closed-Loop Controlled SiC-Based Boost Converter", 2020 IEEE Applied Power Electronics Conference and Exposition (APEC), IEEE< Mar. 15, 2020, pp. 285-291.

* cited by examiner

SWITCH MODE POWER SUPPLY SYSTEM WITH ZERO VOLTAGE SWITCHING

CROSS-REFERENCE TO RELATED APPLICATION

This application claims priority to U.S. Provisional Patent Application No. 63/257,511 filed Oct. 19, 2021, which is hereby incorporated herein by reference.

BACKGROUND

A power supply system can transfer electric power from an alternating current (AC) source to a load. The power supply system can rectify an AC voltage to generate a direct current (DC) voltage. The power supply system can also include a power converter, such as a switch mode power converter, to regulate the DC voltage at a target DC voltage, and provide the regulated DC voltage to the load. The power supply system may employ various techniques to improve the efficiency of electric power transfer, such as reducing the phase delay between an AC current drawn from the AC source and the AC voltage, and reducing the power loss during the switching of the power converter.

SUMMARY

An apparatus comprises: a controller circuit having a first control input, a second control input, a third control input, a first control output and a second control output. The controller circuit is configured to: at the first control input, receive a first measurement signal representing a power converter input voltage; at the second control input, receive a second measurement signal representing a power converter output voltage; and at the third control input, receive an indication of whether a voltage across a switch is positive during a state change of the switch. The controller circuit is also configured to, based on the first and second measurement signals and the indication, determine: a charging interval; a first dead time interval after the charging interval; a discharging interval; and a second dead time interval after the discharging interval. The controller circuit is also configured to provide a first control signal at the first control output, and provide a second control signal at the second control output. Within the charging interval, the first control signal has a first state, and the second control signal has a second state. Within the first and second dead time intervals, the first and second control signals have the second state. Within the discharging interval, the first control signal has the second state, and the second control signal has the first state.

An apparatus comprises a power converter, a first measurement circuit, a second measurement circuit, a third measurement circuit, and a controller circuit. The power converter has a positive input, a negative input, a positive output, and a negative output, the power converter including a first switch, a second switch, and an inductor, the first switch and the second switch coupled in series between the positive and negative outputs, and a first current terminal of the first switch coupled to a second current terminal of the second switch and the inductor. The first measurement circuit has a first measurement input, a second measurement input, and a first measurement output, the first and second measurement inputs coupled to, respectively, the positive and negative inputs of the power converter. The first measurement circuit is configured to provide, at the first measurement output, a first measurement of an input voltage to the power converter. The second measurement circuit has a third measurement input, a fourth measurement input, and a second measurement output, the third and fourth measurement inputs coupled to, respectively, the positive and negative outputs of the power converter. The second measurement circuit is configured to provide, at the second measurement output, a second measurement of an output voltage to the power converter. The third measurement circuit has a fifth measurement input, a sixth measurement input, and a third measurement output, the fifth measurement input coupled to the first current terminal of the first switch, and the sixth measurement input coupled to a first control terminal of the first switch. The third measurement circuit is configured to provide, at the third measurement output, an indication of whether a voltage across the first switch is positive during a state change of the first switch. The controller circuit has a first control input, a second control input, a third control input, a first control output, and a second control output, the first control input coupled to the first measurement output, the second control input coupled to the second measurement output, the third control input coupled to the third measurement output, the first control output coupled to the first control terminal of the first switch, and the second control output coupled to a second control terminal of the second switch. The controller circuit is configured to, based on the first and second measurements and the indication signal, determine: a charging interval in which the inductor is charged; a first dead time interval after the charging interval; a discharging interval in which the inductor is discharged; and a second dead time interval after the discharging interval. The controller circuit is also configured to: within the charging interval, enable the first switch and disable the second switch; within the first dead time interval, disable the first and second switches; within the discharging interval, disable the first switch and enable the second switch; and within the second dead time interval, disable the first and second switches.

A method comprises: receiving, from a first measurement circuit coupled across a positive input and a negative input of a power converter, a first measurement signal of an input voltage to the power converter; receiving, from a second measurement circuit coupled across a positive output and a negative output of the power converter, a second measurement signal of an output voltage of the power converter; and receiving, from a third measurement circuit coupled to a current terminal of a first switch of the power converter, an indication of whether a voltage across the first switch is positive during a state change of the first switch. The method further comprises: based on the first and second measurement signals and the indication signal, determining: a charging interval; a first dead time interval after the charging interval; a discharging interval; and a second dead time interval after the discharging interval. The method further comprises: within the charging interval, enabling the first switch and disabling a second switch of the power converter; within the first dead time interval, disabling the first and second switches; within the discharging interval, disabling the first switch and enabling the second switch; and within the second dead time interval, disabling the first and second switches.

DETAILED DESCRIPTION

Figure 1:
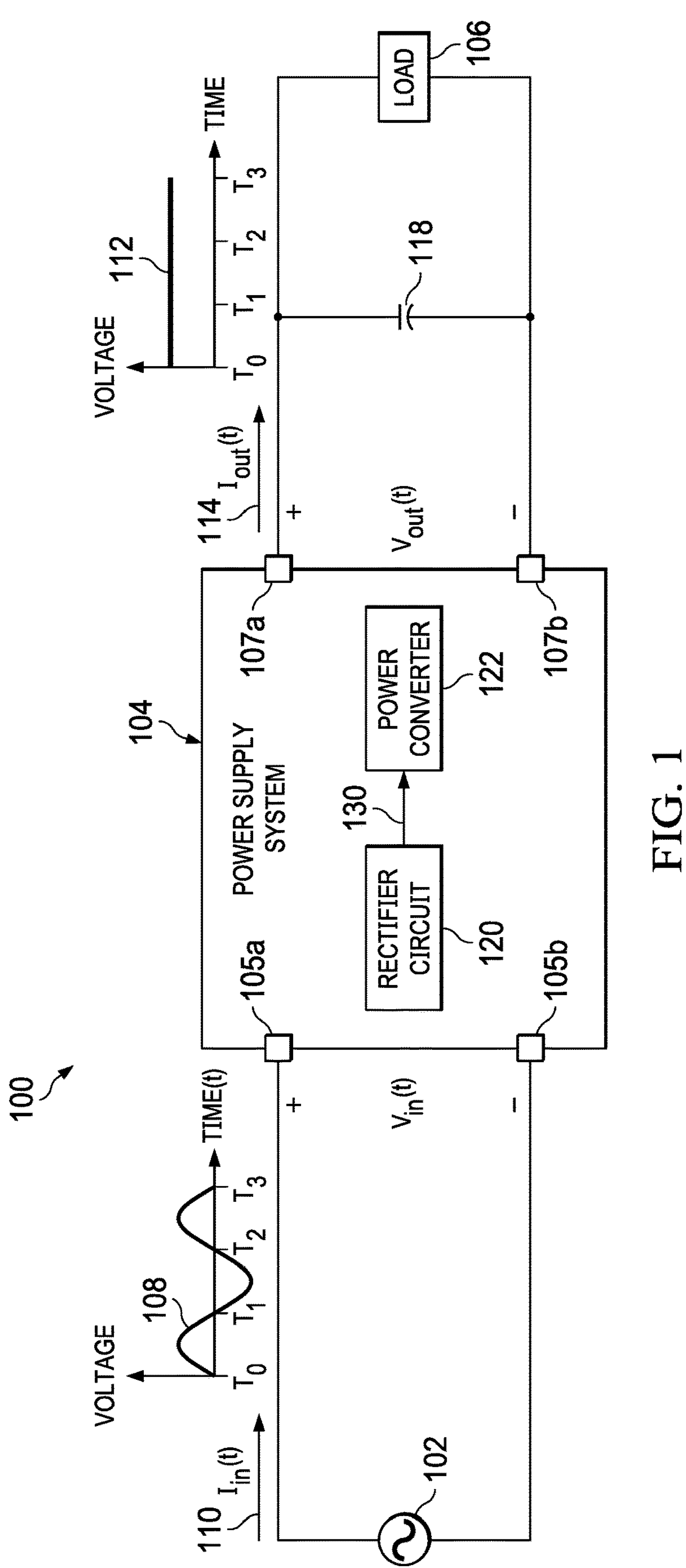
FIG. 1 is a schematic diagram of an example electric power transfer system.

FIG. 1 is a schematic diagram that illustrates an example of an electric power transfer system 100. System 100 may include an AC power source 102, a power supply system 104, and a load 106. Power supply system 104 can include a positive input 105*a*, a negative input 105*b*, a positive output 107*a*, and a negative output 107*b*. AC power source 102 can provide an AC input voltage signal 108 (labelled $V_{in}(t)$) across positive input 105*a* and negative input 105*b*. AC input voltage signal 108 can have positive half-cycles when the voltage signal is positive (e.g., between $T_0$ and $T_1$ and between $T_2$ and $T_3$) and negative half-cycles when the voltage signal is negative (e.g., between $T_1$ and $T_2$). In the positive half-cycles, positive input 105*a* can receive a higher voltage than negative input 105*b*, and in the negative half-cycles, the polarities are reversed and positive input 105*a* can receive a lower voltage than negative input 105*b*. An AC input current signal 110 (labelled $I_{in}(t)$) can also flow into positive input 105*a* and return back to AC power source 102 from negative input 105*b* in the positive half-cycles of AC input voltage signal 108. The AC input current signal can also flow into negative input 105*b* and return back to AC power source 102 from positive input 105*a* in the negative half-cycles of AC input voltage signal 108.

From AC input voltage signal 108, power supply system 104 can generate a DC output voltage signal 112 (labelled $V_{out}(t)$) across positive output 107*a* and negative output 107*b*. Positive output 107*a* can provide a positive power supply rail, and negative output 107*b* can provide a negative power supply rail. Power supply system 104 can supply DC output voltage signal 112 to load 106, which can include electronic components that operate on a DC voltage. Power supply system 104 can also provide an output DC current signal 114 (labelled $I_{out}(t)$), which can flow out of positive output 107*a*, through load 106, and return back to negative output 107*b*. System 100 can include a capacitor 118 to perform a filtering operation to reduce the ripples in DC output voltage signal 112 and output DC current signal 114.

To generate DC output voltage signal 112 from AC input voltage signal 108, power supply system 104 can include a rectifier circuit 120 and a power converter circuit 122. Rectifier circuit 120 can perform a rectification operation to convert AC input voltage signal 108 to a DC input voltage signal 130. As part of the rectification operation, rectifier circuit 120 can pass the positive voltages of AC input voltage signal 108 during the positive half cycles as the DC input voltage signal 130. Rectifier circuit 120 can also block the negative voltages of AC input voltage signal 108 during the negative half cycles in a half-wave rectification operation, or convert the negative voltages to positive voltages in a full-wave rectification operation, and generate a pulsating DC input voltage signal 130. Power converter circuit 122 can then generate DC output voltage signal 112 from DC input voltage signal 130 based on a conversion ratio. In a case where power converter circuit 122 is a step-up converter (e.g., a boost converter), the conversion ratio can be higher than one, and DC output voltage signal 112 can become higher than DC input voltage signal 130. In a case where power converter circuit 122 is a step-down converter (e.g., a buck converter), the conversion ratio can be lower than one, and DC output voltage signal 112 can become lower than DC input voltage signal 130.

In addition to generating DC output voltage signal 112, power converter circuit 122 may perform a power factor correction operation. Power factor can be defined as a ratio of the real power measured in watts (W) consumed by load 106 divided by the total apparent power measured in volt-amperes (VA) circulating between AC power source 102 and load 106. A high power factor (close to one) can indicate that a large percentage of the power supplied by AC power source 102 (apparent power) is delivered to and consumed by load 106. The power factor correction operation can be performed to increase the power factor up to one.

Power factor (PF) can be given by a phase relationship φ between AC input voltage signal 108 and AC input current signal 110 according to the following Equation:

$$PF=\cos(\varphi) \quad \text{(Equation 1)}$$

Figure 2:
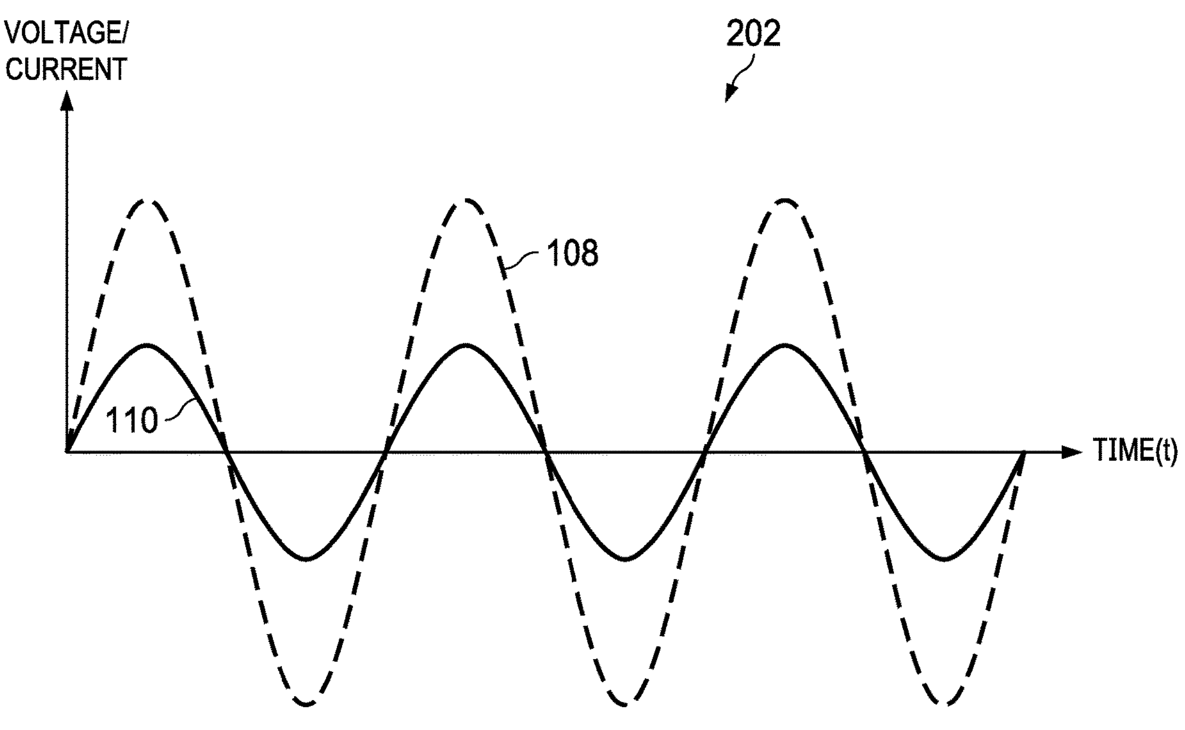
FIG. 2 are waveform diagrams that illustrate examples of phase relationships between input voltage and input current of the electric power transfer system of FIG. 1.
Figure 2:
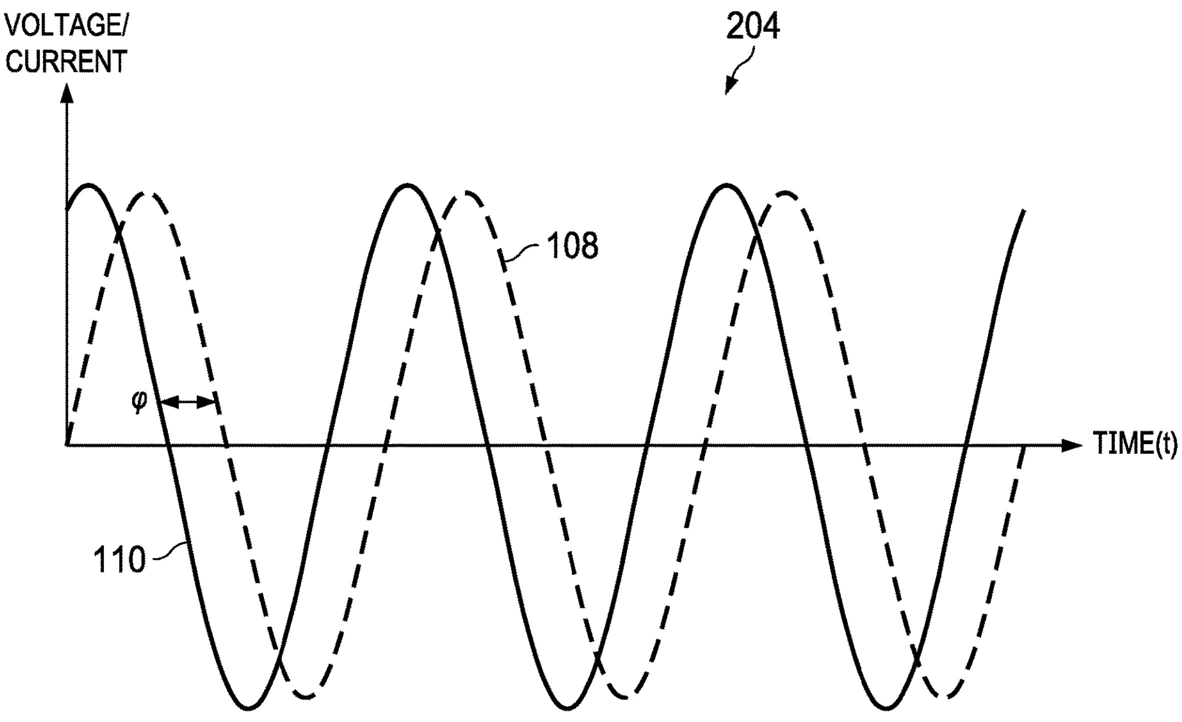

FIG. 2 illustrates charts 202 and 204 of example phase relationship φ between AC input voltage signal 108 and AC input current signal 110 and the corresponding power correction factors. In chart 202, AC input voltage signal 108 and AC input current signal 110 has a zero phase difference, which can lead to a power factor of one. In chart 204, AC input voltage signal 108 and AC input current signal 110 has a phase difference of φ, and the power factor can become lower than one. As shown in FIG. 2, the amplitude of AC input current signal 110 in chart 204 (with a reduced power factor) is increased, so that the same amount of power can be consumed by load 106 as in chart 202 where the power factor is one. Accordingly, increasing the power factor can improve the efficiency of power transfer by power supply system 104.

Figure 3:
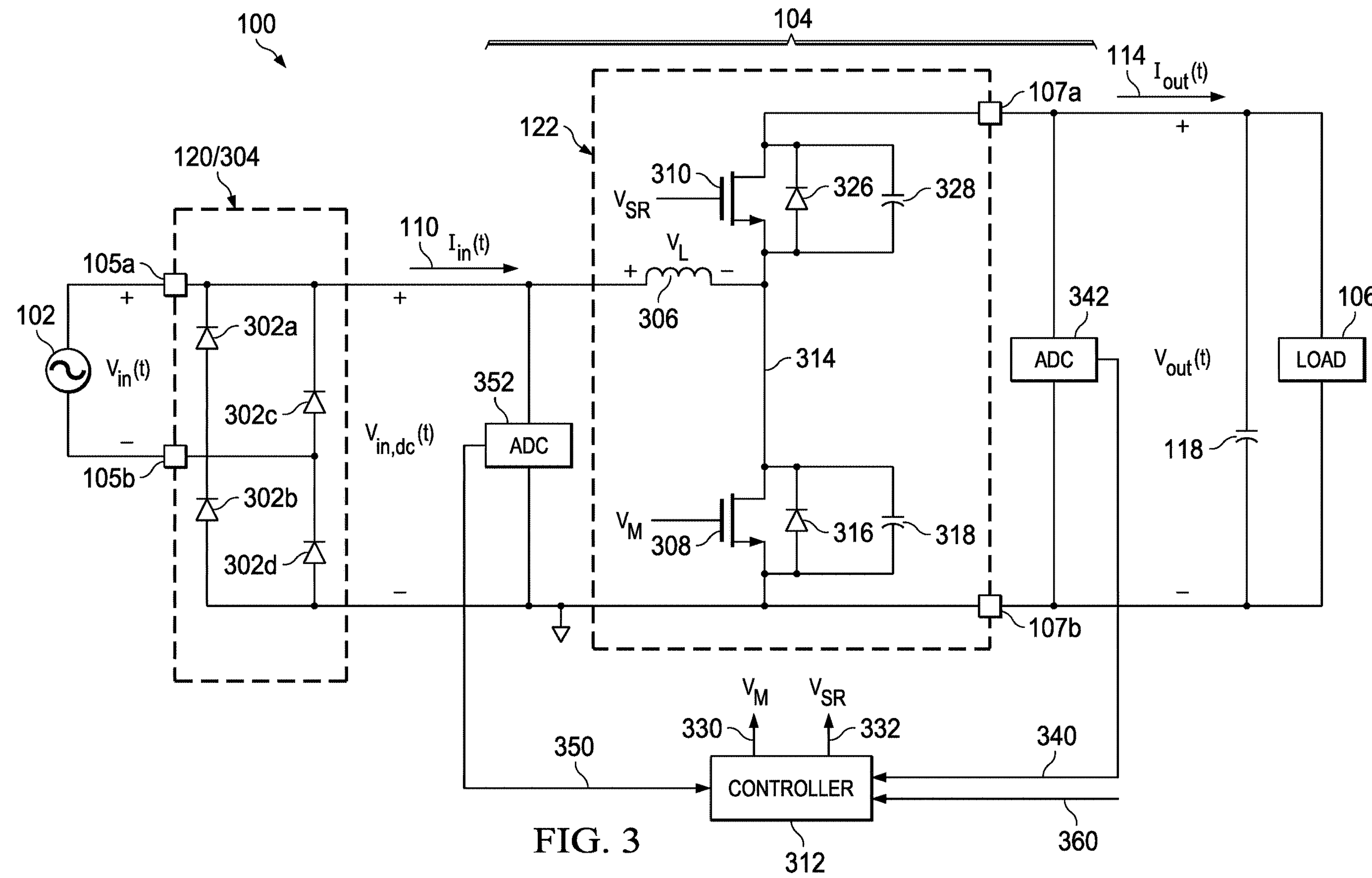
FIG. 3 is a schematic diagram of an example power supply system that can be part of the electric power transfer system of FIG. 1.

FIG. 3 is a schematic diagram of an example power supply system 104. Referring to FIG. 3, power supply system 104 can include diodes 302*a*, 302*b*, 302*c*, and 302*d* coupled between positive input 105*a* and negative input 105*b* forming a diode bridge 304. Diode bridge 304 can be part of rectifier circuit 120 and can perform a full-wave rectification operation to generate a pulsating DC input voltage signal 130 from AC input voltage signal 108. Also, power converter circuit 122 can include an inductor 306, a switch 308, a switch 310, and can be coupled to a controller 312 that controls switches 308 and 310. Inductor 306 and switches 308 and 310 can be coupled at a node 314, and switches 308 and 310 can be coupled in series between positive output 107*a* and negative output 107*b*. The voltage of node 314 can switch between the positive and negative power supply rails within a switching cycle and can be a switching node. In FIG. 3, negative output 107*b* can be coupled to a ground. In other examples, negative output 107*b* can be coupled to a low impedance voltage source to provide a reference voltage and to provide a return path for output DC current signal 114.

Inductor 306 and switches 308 and 310 can be configured as a boost converter. Switch 308 can be a main switch to control the flow of AC input current signal 110 through inductor 306 to store magnetic energy in the inductor. Switch 310 can be a synchronized rectifier (SR). When enabled, switch 310 allows inductor 306 to discharge to supply a current to load 106. Also, when switch 310 is disabled, the body diode of switch 310 can block the flow of current from load 106 back to inductor 306. Each of switches 308 and 310 can include a transistor, such as a silicon field effect transistor (FET), and a gallium nitride (GaN) high electron mobility transistor (HEMT). In the example shown in FIG. 3, each of switches 308 and 310 can be an n-channel FET (NFET). Each switch can include a body diode and parasitic capacitances. In FIG. 3, a diode 316 and a capacitor 318 can represent the respective body diode and parasitic capacitance of switch 308, and a diode 326 and a capacitor 328 can represent the respective body diode and parasitic capacitance of switch 310.

Controller 312 can generate control signal 330 (labelled $V_M$ in FIG. 3) to enable/disable main switch 308 in each switching cycle. Controller 312 can also generate control signal 332 (labelled $V_{SR}$ in FIG. 3) to enable/disable SR switch 310 in each switching cycle. Controller 312 can receive measurements 340 of the magnitude of DC output voltage signal 112 ($V_{out}$(t) from a measurement circuit 342 (e.g., an analog-to-digital converter (ADC)), measurements 350 of the magnitude of DC input voltage signal 130 ($V_{in,dc}$(t)) output by rectifier circuit 120 from a measurement circuit 352 (e.g., an ADC), and a reference DC output voltage 360. Controller 312 can control the timings and durations of control signals $V_M$ and $V_{SR}$ based on the measurements and the reference to achieve a target DC output voltage signal 112. Also, controller 312 can determine the duration of control signals $V_M$ and $V_{SR}$ based on measurements of AC input voltage signal 108 to reduce the phase difference between AC input voltage signal 108 and AC input current signal 110 and improve the power factor. Throughout the switching cycles, a voltage $V_L$ can develop across inductor 306, which can affect AC input current signal 110 as well as DC output voltage signal 112.

Figure 4:
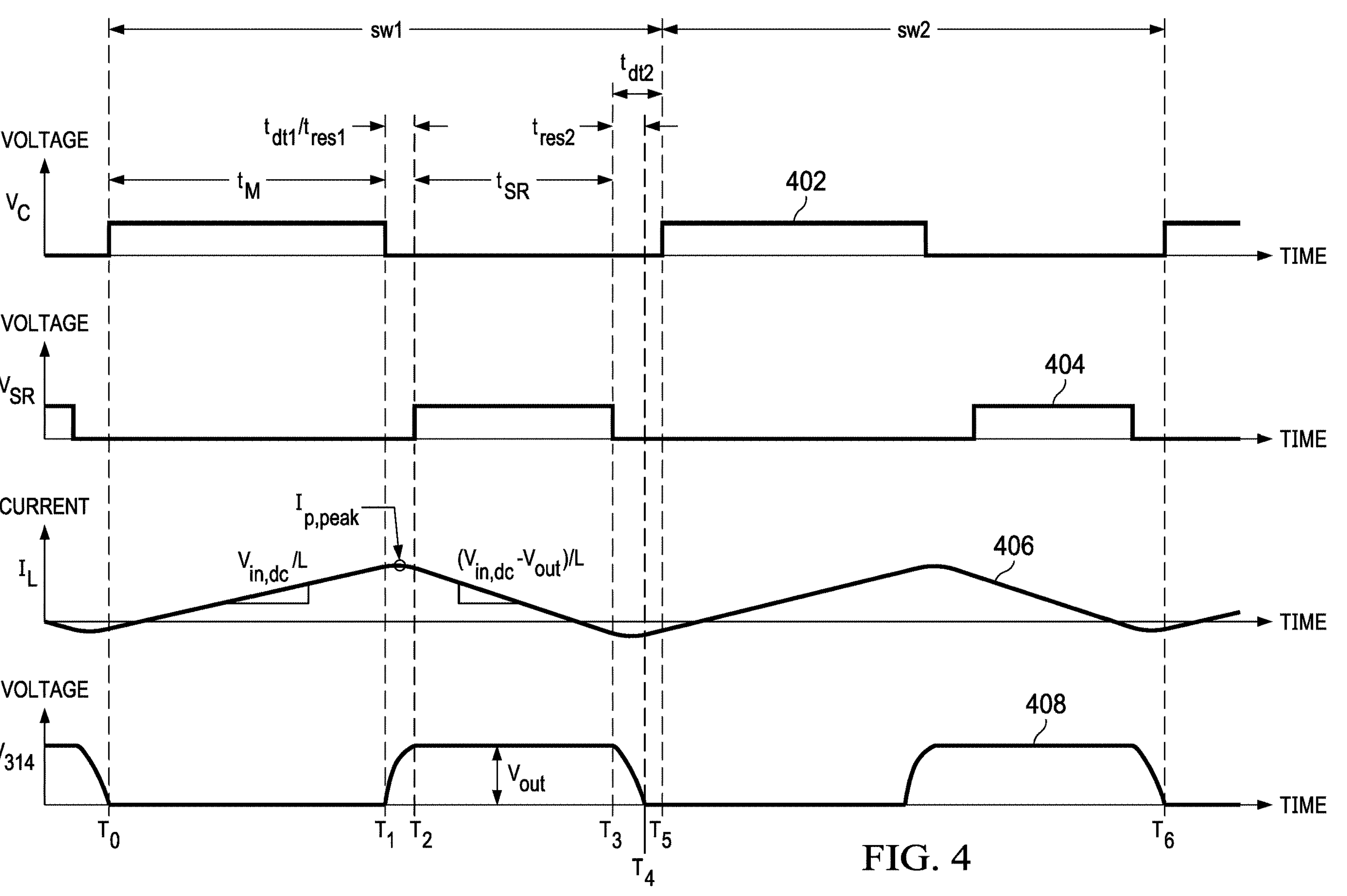
FIG. 4 and FIG. 5 include waveform diagrams that illustrate example operations of the power supply system of FIG. 3.

FIG. 4 includes include waveform diagrams that illustrate example operations of power converter circuit 122 of FIG. 3. FIG. 4 includes graphs 402, 404, 406, and 408. Graph 402 illustrates the variation of control signal 330 ($V_M$) with respect to time, and graph 404 illustrates the variation of control signal 332 ($V_{SR}$) with respect to time, both controlled by controller 312. Also, graph 406 illustrates the variation of inductor current that flows through inductor 306 with respect to time, and graph 408 illustrates the variation of voltage of node 314 with respect to time.

A first switching cycle (sw1) starts at time $T_0$. Between $T_0$ and $T_1$ can be a first charging interval, in which controller 312 provides a $V_M$ signal at a first state to enable main switch 308, and provides a $V_{SR}$ signal at a second state to disable SR switch 310. In a case where main switch and SR switch 310 are NFETs, the $V_M$ and $V_{SR}$ signals at the first state can each be a gate voltage that exceeds the source voltage by at least a conduction threshold of the NFET, and the $V_M$ and $V_{SR}$ signals at the second state can each be a gate voltage that is below a sum of the source voltage and the conduction threshold. With main switch 308 enabled, the voltage of node 314 can be brought to ground, and the voltage $V_L$ across inductor 306 can be equal to DC input voltage signal 130 ($V_{in,dc}$). Inductor 306 can be charged within the first charging interval between $T_0$ and $T_1$, and an increasing positive charging current that charges inductor 306 can flow from inductor 306 towards switch 308. Body diode 326 is reverse-biased and can prevent current from flowing from load 106/capacitor 118 back to switch 308 and ground. With inductor 306 having an inductance L, the inductor current IL, which can be equal to AC input current signal 110 ($I_{in}$(t)) from AC power source 102, can increase based on the following Equation:

$$\frac{dI_L}{dt} = \frac{V_L}{L} = \frac{V_{in,dc}}{L} \quad \text{(Equation 2)}$$

In Equation 2, as DC input voltage signal 130 ($V_{in,dc}$) is positive, the slope of inductor current $$\frac{dI_L}{dt}$$

is also positive, and the inductor current increases between times $T_0$ and $T_1$. The positive inductor current can peak at time $T_1$. With the duration between times $T_0$ and $T_1$ equals $t_M$, which represents the duration of the turn-on interval of main switch 308 in which main switch 308 is enabled, a positive peak inductor current $I_{p,peak}$ at time $T_1$ can be related to $V_{in,dc}$ and $t_M$ based on the following Equation:

$$I_{p,peak} = \frac{V_{in,dc}}{L} \times t_M \quad \text{(Equation 3)}$$

Between $T_1$ and $T_2$ can be a first dead time interval in which controller 312 can set both $V_M$ and $V_{SR}$ signals to the second state to disable the respective switches 308 and 310. The duration between $T_1$ and $T_2$ (labelled $t_{dt1}$) can include a first resonant interval (labelled $t_{res1}$) of the switching cycle in which inductor 306 resonates with capacitors 318 and 328. During the first resonant interval, inductor current from inductor 306 can charge capacitor 318 and discharge capacitor 328, and the voltage of node 314 can increase until it is clamped by body diode 326 of switch 310 to the positive power supply rail (e.g., $V_{out}$). As the peak inductor current is used to charge capacitor 318 and discharge capacitor 328, $t_{res1}$ can be relatively short.

Between $T_2$ and $T_3$ can be a discharging interval, in which controller 312 can set $V_M$ signal to the second state to continue disabling main switch 308, and set $V_{SR}$ signal to the first state to enable SR switch 310. Inductor 306 dissipates the stored magnetic energy to supply a discharging current to load 106 and capacitor 118. With switching node 314 at $V_{out}$, the inductor voltage $V_L$ becomes $V_{in,dc}-V_{out}$, and the rate of change of inductor current becomes:

$$\frac{dI_L}{dt} = \frac{V_L}{L} = \frac{V_{in,dc} - V_{out}}{L} \quad \text{(Equation 4)}$$

As $V_{in,dc}$ is lower than $V_{out}$ in a step-up conversion operation, $V_L$ becomes negative, and inductor 306 is discharged to supply a current to load 106 and/or capacitor 118. The inductor current, as well as input current $I_{in}(t)$, can reduce linearly from the positive peak current ($I_{p,peak}$) between $T_2$ and $T_3$ due to negative $$\frac{dI_L}{dt}.$$

The inductor current may continue to drop between $T_2$ and $T_3$ and become negative. The negative inductor current can flow towards AC power source 102, remove charge from capacitor 318 of main switch 308, and add charge to capacitor 328 of SR switch 310. The duration between $T_2$ and $T_3$ equals $t_{SR}$, which represents the turn-on interval of SR switch 310 in which the SR switch is enabled. The negative discharging current of the inductor when SR switch 310 is disabled can be an SR turn-off current.

The SR turn-off current can be based on the positive peak charging current, the inductance of inductor 306 that sets the rate of reduction of the inductor current, and the duration of turn-on interval of SR switch 310 $t_{SR}$. In some examples, controller 312 can determine $t_{SR}$ based on determining the SR turn-off current needed to remove the charge of capacitor 318 of main switch 308 and add charge to capacitor 328 of SR switch 310 in a subsequent resonant interval. With such arrangements, node 314 can drop to the negative power supply rail (e.g., ground) prior to main switch 308 being enabled again. As the voltage across main switch 308 is zero (or lower than zero) when the state of main switch 308 is switched, zero voltage switching (ZVS) can be achieved, which can reduce power loss during the switching of main switch 308.

In some examples, controller 312 can determine $t_{SR}$ based on comparing DC input voltage signal 130 ($V_{in,dc}$) and DC output voltage signal 112 ($V_{out}$). The DC input voltage can affect the positive peak inductor current ($I_{p,peak}$) and the amount of charge stored in capacitor 318 of main switch 308, which in turn can affect the amount of SR turn-off current needed to discharge capacitor 318 and bring the voltage of node 314 to ground in the second resonant interval. If $V_{in,dc}$ is equal to or less than half of $V_{out}$, a zero SR turn-off current may be sufficient. But if $V_{in,dc}$ exceeds half of $V_{out}$, controller 312 can extend the turn-on interval $t_{SR}$ of SR switch 310 such that the SR turn-off current is a negative current (e.g., flows towards AC power source 102). Controller 312 can determine the minimum SR turn-off current, and when to disable SR switch 310, based on $V_{out}$, the inductance of inductor 306, and the total capacitances of capacitors 318 and 328.

Between $T_3$ and $T_5$ can be a second dead time interval in which controller 312 can set both $V_M$ and $V_{SR}$ signals to the second state to disable both switches 308 and 310. The duration of the second dead time interval (labelled $t_{dt2}$) can include a second resonant interval ($t_{res2}$) of the switching cycle, between $T_3$ and $T_4$, in which inductor 306 and capacitors 318 and 328 form a resonant system. During the second resonant interval, the negative inductor current can remove charge from capacitor 318 of main switch 308 and add charge to capacitor 328 of SR switch 310. This causes the voltage of node 314 to drop to ground due to resonation. Controller 312 can determine $t_{res2}$ based on the SR turn-off current, $V_{in,dc}$, $V_{out}$, and the resonant frequency, which can be based on the total capacitances of capacitors 318 and 328 and the inductance of inductor 306. The voltage of node 314 can drop to the negative power supply rail (e.g., ground in FIG. 3) at the end of the second resonant interval at time $T_4$.

Between $T_4$ and $T_5$ can be part of a second charging interval as the voltage of node 314 drops to ground and becomes lower than $V_{in,dc}$, a positive inductor voltage $V_L$ can be induced across inductor 306. The inductor current can flow through body diode 316 of main switch 308. Inductor 306 can be charged between $T_4$ and $T_5$. and The polarity of the inductor current may change during the second charging interval, or can depend on the initial condition at $T_4$.

At $T_5$, controller 312 can set $V_M$ signal to the first state to enable main switch 308 and start a new switching cycle sw2, which ends at time $T_6$. At $T_5$ as the voltage across main switch 308 is zero when enabled, zero voltage switching (ZVS) can be achieved, which can reduce power dissipation caused by the enabling/disabling of main switch 308 and further improve the efficiency of power converter circuit 122.

As the average inductor voltage $V_L$ in steady state equals zero, the DC input voltage signal 130 ($V_{in,dc}$) and the DC output voltage signal 112 ($V_{out}$) can be related to the turn-on interval of main switch 308 ($t_M$) and the turn-on interval of SR switch 310 ($t_{SR}$) as follows:

$$V_{in,dc} \times t_M + (V_{in,dc} - V_{out}) \times t_{SR} = 0 \quad \text{(Equation 5)}$$

From Equation 5, DC output voltage signal 112 ($V_{out}$) can be related to DC input voltage signal 130 ($V_{in,dc}$) based on the following Equation:

$$\frac{V_{out}}{V_{in,dc}} = 1 + \frac{t_M}{t_{SR}} \quad \text{(Equation 6)}$$

Referring again to FIG. 3, controller 312 can receive measurements 350 of DC input voltage signal 130, measurements 340 of DC output voltage signal 112, and reference DC output voltage 360 at the beginning of a switching cycle, and set $t_M$ and $t_{SR}$ of that switching cycle based on the measurements and Equation 6. For example, controller 312 can include a proportional integration (PI) controller that integrates a difference between DC output voltage signal 112 and reference DC output voltage 360, and determine $t_M$ and $t_{SR}$ of that switching cycle based on comparing the integrated difference and DC input voltage signal 130 as in Equation 6.

Also, controller 312 can set the $t_M$ and/or $t_{SR}$ of each switching cycle for a power factor correction operation. In some examples, controller 312 can set the $t_M$ and/or $t_{SR}$ to operate power converter circuit 122 in a critical conduction mode (CRM), where controller 312 enables main switch 308 when inductor current is at (or close to) zero at the start of each switching cycles, as shown in FIG. 4. Critical conduction mode can provide various advantageous. For example, as main switch 308 is enabled and SR switch 310 are disabled when inductor current is zero, zero current switching (ZCS) can be achieved, which can reduce power dissipation caused by the enabling/disabling of the switches and improve the efficiency of power converter circuit 122. Moreover, because no current flows through SR switch 310 when it is disabled, body diode 326 of SR switch 310 needs not have a fast recovery time, which allows SR switch 310 to be implemented with a relatively low bandwidth device and/or allows power converter circuit 122 to operate at a higher switching frequency.

Figure 5:
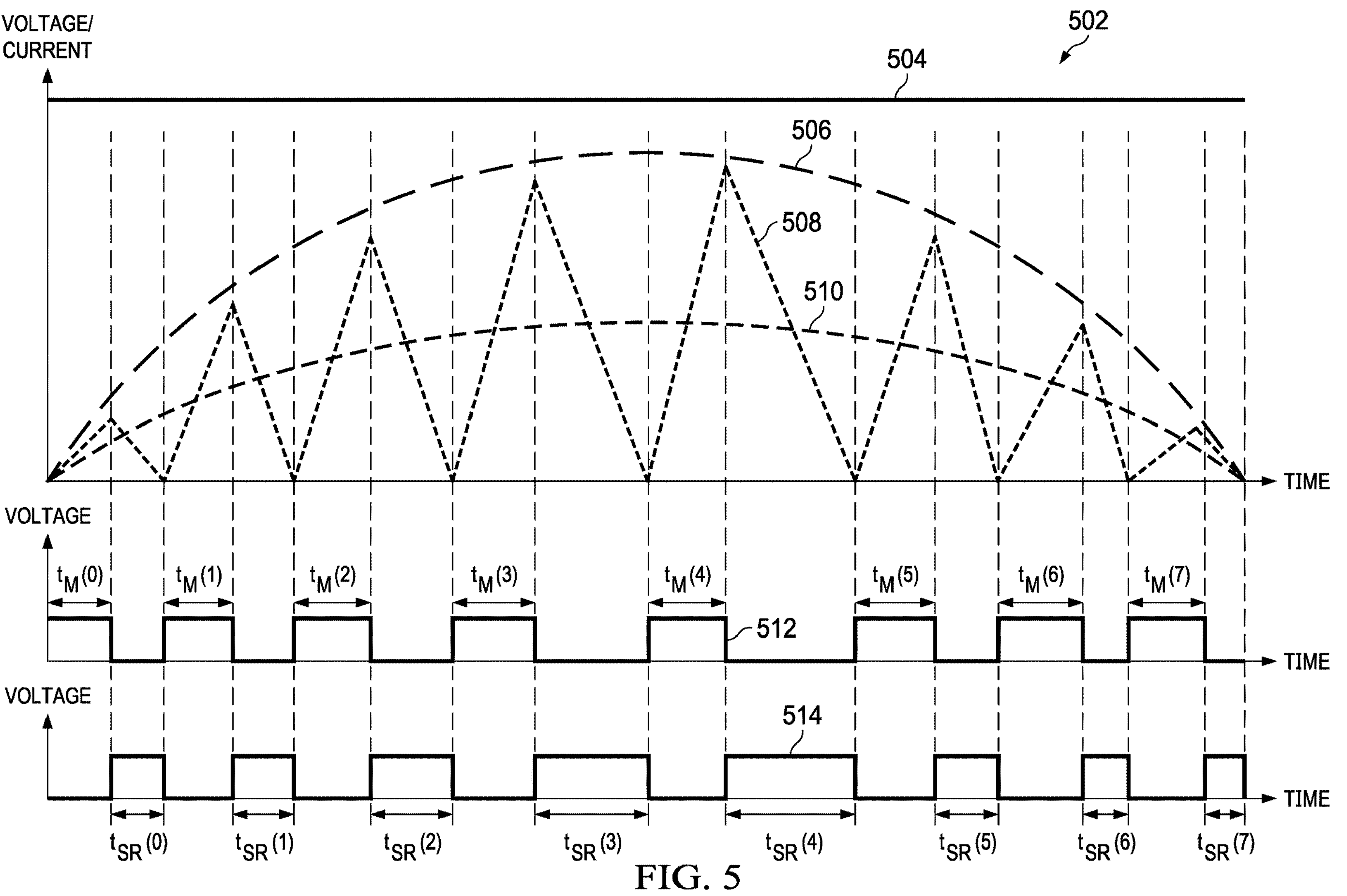

FIG. 5 includes a chart 502 that illustrates a CRM operation by controller 312 over a half cycle of AC input voltage signal 108. Chart 502 includes graphs 504, 506, 508, 510, 512, and 514. Graph 504 represents reference DC output voltage 160. Graph 506 represents DC input voltage signal 130 or a positive half-cycle of AC input voltage signal 108. Graph 508 represents the inductor current through inductor 306, and graph 510 represents the average inductor current, which also equals to the AC input current signal 110 ($I_{in}$). Graph 512 represents the variation of $V_M$ signal for main switch 308, and graph 514 represents the variation of $V_{SR}$ signal for SR switch 310.

In FIG. 5, in each switching cycle, controller 312 can determine the duration of main switch turn-on interval ($t_M$) based on a target positive peak current $I_{p,peak}$, which in turn can set the average input current over the switching cycle. $T_0$ reduce the phase difference between AC input current signal 110 and the AC input voltage signal 108, controller 312 can determine $t_M$ such that the average input current of each switching cycle has a constant relationship with the AC input voltage signal of the respective switching cycle. Referring again to Equation 3, as the DC input voltage signal 130 (which reflects AC input voltage signal 108) is proportional to the positive peak current in a switching cycle, controller 312 can maintain $t_M$ at a substantially constant value based on a target current to be supplied to load 106 and capacitor 118. Controller 312 can also adjust the duration of SR switch turn-on interval ($t_{SR}$) between different switching cycles to provide time for the inductor current to drop from the positive peak value to zero, and to adjust the step-up ratio between DC output voltage signal 112 ($V_{out}$) and DC input voltage signal 130 ($V_{in,dc}$), as the DC input voltage and the positive peak inductor current vary with the AC input voltage. Accordingly, the switching cycles can have a varVing frequency. The switching cycle periods can be at a maximum when DC input voltage signal 130 becomes closer to reference DC output voltage 160, and controller 312 can increase $t_{SR}$ to reduce the step-up ratio. Also, the switching frequency can be at a maximum as DC input voltage signal 130 is approaches zero, and controller 312 can decrease $t_{SR}$ to increase the step-up ratio. For example, in FIG. 5, the third cycle period comprising $t_M$(3) and $t_{SR}$(3) and the fourth cycle period comprising $t_M$(4) and $t_{SR}$(4) can have the maximum durations within the half-cycle, and the zeroth cycle period comprising $t_M$(0) and $t_{SR}$(0) and the seventh cycle period comprising $t_M$(7) and $t_{SR}$(7) can have the minimum durations within the half-cycle.

Figure 6:
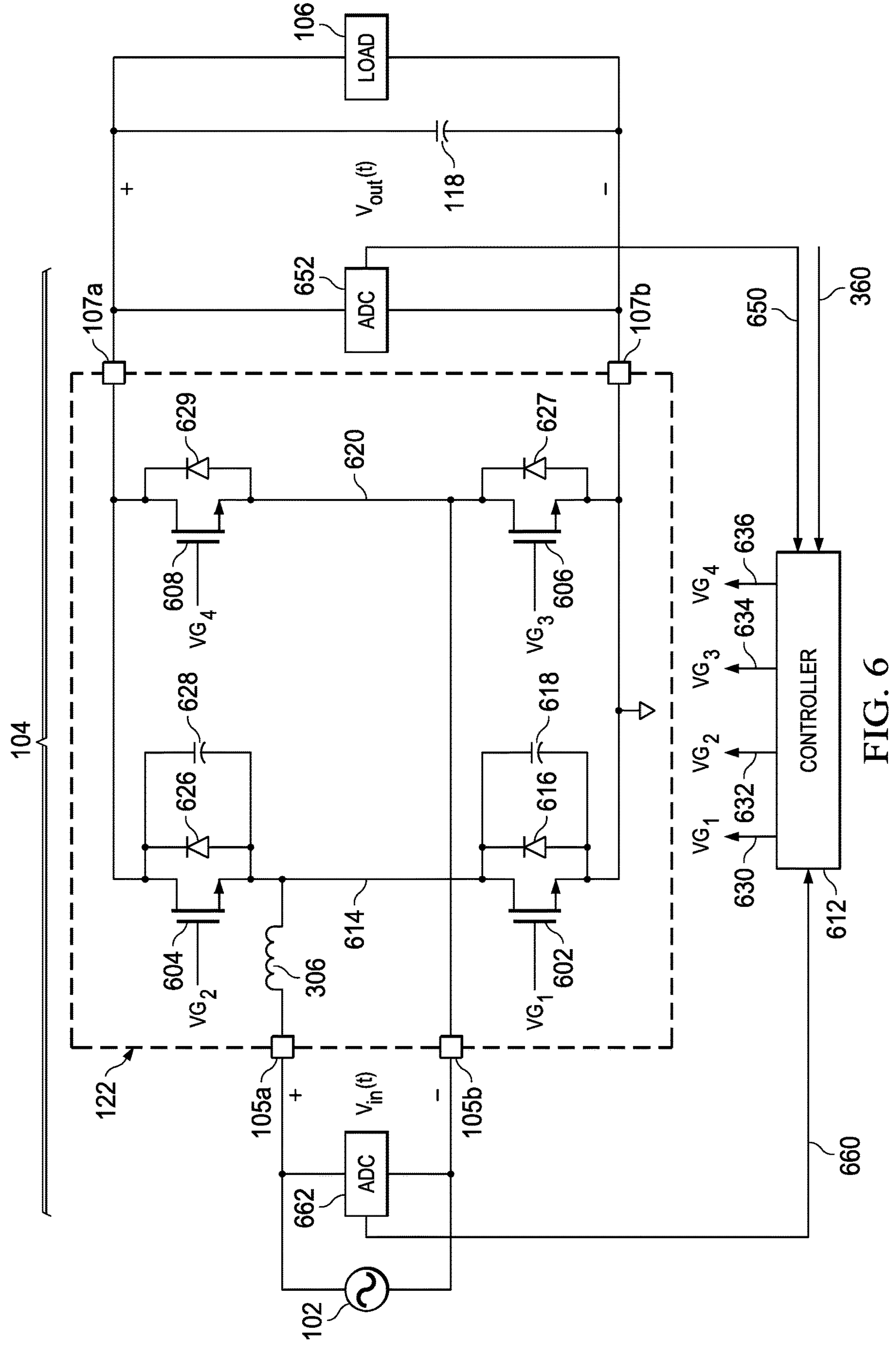
FIG. 6 is a schematic diagram of an example power supply system that can be part of the electric power transfer system of FIG. 1.

FIG. 6 is a schematic diagram of another example of power supply system 104, in which the operations of rectifier circuit 120 and power converter circuit 122 are performed using a set of switches and their body diodes. Referring to FIG. 6, power supply system 104 can include power converter 122, which includes inductor 306 and switches 602, 604, 606, and 608, and a controller 612 coupled to power converter 122. Switches 602, 604, and inductor 306 are coupled at a node 614, and switches 602 and 604 are coupled in series between positive output 107*a* and negative output 107*b*. Node 614 can switch between the positive and negative power supply rails and can be a switching node. Also, switches 606 and 608 are coupled at a node 620, and switches 606 and 608 are also coupled in series between positive output 107*a* and negative output 107*b*. Inductor 306 is coupled between positive input 105*a* and node 614, and node 620 between switches 606 and 608 is coupled to negative input 105*b*.

Switches 602, 604, 606 and 608 can be NFETs. Switches 602 and 604 can support multiple switching cycles within a half cycle of AC input voltage signal 108 ($V_{in}$), and switches 606 and 608 can switch once every half cycle of the AC input voltage signal. Each of switches 602 and 604 can have a higher bandwidth than the respective switches 606 and 608. In some examples, each of switches 602 and 604 can include a transistor such as an NFET or a GaN HEMT, and each of switches 606 and 608 can include a FET. Switch 602 can have a body diode 616 and a parasitic capacitor 618, and switch 604 can have a body diode 626 and a parasitic capacitor 628. Switch 606 can have a body diode 627, and switch 608 can have a body diode 629. For simplicity, the parasitic capacitances of switches 606 and 608 are omitted.

In some examples, switches 602, 604, 606, and 608, and inductor 306 can be configured as a totem pole boost rectifier. Controller 612 can generate control signals 630 (labelled $V_{G1}$), 632 (labelled ($V_{G2}$), 634 (labelled $VG_3$), and 636 (labelled $VG_4$) to enable/disable, respectively, switches 602, 604, 606, and 608 to perform rectification, power factor correction, and step-up conversion operations.

During a positive half-cycle of $V_{in}$ when negative input 105*b* receives a lower voltage than positive input 105*a*, switch 606 is enabled to couple the negative power supply rail (and negative output 107*b*) to negative input 105*b* to receive the lower input voltage, while inductor 306 (when switch 604 is enabled) can connect the positive power supply rail (and positive output 107*a*) to positive input 105*a*. Accordingly, positive output 107*a* can have a positive polarity and negative output 107*b* can have a negative polarity. Also, switch 608 is disabled to cause the inductor current to flow through capacitor 118 and load 106 and return to AC power source 102 via switch 606. Controller 612 can operate switch 602 as the main switch and switch 604 as the SR switch. Controller 612 can generate a sequence of control signals $V_{G1}$ identical to control signals $V_M$ and a sequence of control signals $V_{G2}$ identical to control signals $V_{SR}$ in FIG. 4. In each switching cycle of the positive half-cycle of $V_{in}$, in the charging interval ($t_M$), switch 602 is enabled and switch 604 is disabled. The charging interval also includes a first charging interval in which the inductor is charged. The charging internal is followed by a first dead time interval ($t_{dt1}$) in which both switches are disabled. The first dead time interval can include a first resonant interval $t_{res1}$, in which the voltage of node 614 transitions to the positive power supply rail (e.g., $V_{out}$) by resonance. The first dead time interval is followed by the discharging interval ($t_{SR}$) in which the switch 602 is disabled and switch 604 is enabled, and the inductor discharges The discharging interval is followed by the second dead time interval ($t_{dt2}$), which can include a second resonant interval $t_{res2}$ in which the voltage of node 614 transitions to negative power supply rail (e.g., ground) by resonance, and a second charging interval in which the inductor is charged. A new switching cycle can start after the second dead time interval. ZVS can be achieved if the voltage of node 614 completes transition to ground by the end of the second resonant interval, so that the voltage across switch 602 is zero (or below zero) when switch 602 changes from the disabled state to the enabled state to start the new switching cycle.

During a negative half-cycle of $V_{in}$ when negative input 105*b* receives a higher voltage than positive input 105*a*, switch 608 is enabled to couple the positive power supply rail (and positive output 107*a*) to negative input 105*b* to receive the higher input voltage, while the negative power supply rail (and negative output 107*b*) is coupled to positive input 105*a*, to maintain the same polarities between the positive power supply rail and the negative power supply rail across the positive and negative half-cycles. Also, switch 606 is disabled to allow the inductor current to flow through capacitor 118 and load 106 and return to AC power source 102 via switch 602. Controller 612 can operate switch 604 as the main switch and switch 602 as the SR switch. Controller 612 can generate a sequence of control signals $V_{G2}$ identical to control signals $V_M$ and a sequence of control signals $V_{G1}$ identical to control signals $V_{SR}$ in FIG. 4. In each switching cycle of the negative half-cycle of $V_{in}$, in the charging interval ($t_M$), switch 602 is enabled and switch 604 is disabled, and the inductor is charged. The charging internal is followed by the first dead time interval ($t_{dt1}$) in which both switches are disabled, and the voltage of node 614 transitions to the negative power supply rail (e.g., ground) by resonance. The first dead time interval is followed by the discharging interval ($t_{SR}$) in which the switch 602 is disabled and switch 604 is enabled, and the inductor discharges. The discharging interval is followed by the second dead time interval (tam), in which the voltage of node 614 transitions to the positive power supply rail (e.g., $V_{out}$) by resonance, followed by charging of the inductor, and a new switching cycle can start after the second dead time interval. ZVS can be achieved if the voltage of node 614 completes transition to $V_{out}$ by the end of the second interval, so that the voltage across switch 602 is zero (or below zero) when switch 602 changes from the disabled state to the enabled state to start the new switching cycle.

Controller 612 can receive measurements 650 of the magnitude of DC output voltage signal 112 ($V_{out}$) from a measurement circuit 652 (e.g., and ADC), measurements 660 of the polarity and magnitude of AC input voltage signal 108 ($V_{in}$) from a measurement circuit 662 (e.g., an ADC), and reference DC output voltage 360. Controller 612 can determine whether AC input voltage signal 108 is in the positive half-cycle or in the negative half-cycle based on measurements 660. Controller 612 can also determine $t_M$ for switch 602 and $t_{SR}$ for switch 604 based on measurements 650 and reference DC output voltage 360 in both half-cycles.

In some examples, to operate the example power converters of FIG. 3 and FIG. 6 in CRM, the controller (such as controllers 312 and 612) may measure the inductor current through inductor 306 as the inductor current drops during the turn-on interval of the SR switch, and disable the SR switch when the inductor current crosses zero or reaches the minimum SR turn-off current sufficient for the voltage across the main switch to complete transition to one of the power supply rails in the second resonant period to achieve zero voltage switching (ZVS). The controller may extend the turn-on interval of the SR switch ($t_{SR}$) if the magnitude of the AC input voltage exceeds half of the DC output voltage, as described above. Moreover, the controller may determine the duration of the second dead time interval ($t_{dt2}$) based on the SR turn-off current. Specifically, the controller may detect the inductor current within a switching cycle, determine the turn-on interval of the SR switch ($t_{SR}$), and adjust the timing of control signals of the main switch and the SR switch within the same switching cycle. However, due to the delay in the adjustment of $V_{SR}$ control signal, there can be increased current ripples especially when AC input voltage signal 108 (and AC input current signal 110) approaches zero at the beginning and end of each half-cycle. The additional current ripples can incur additional power loss and increase distortions in the AC input current.

Figure 7:
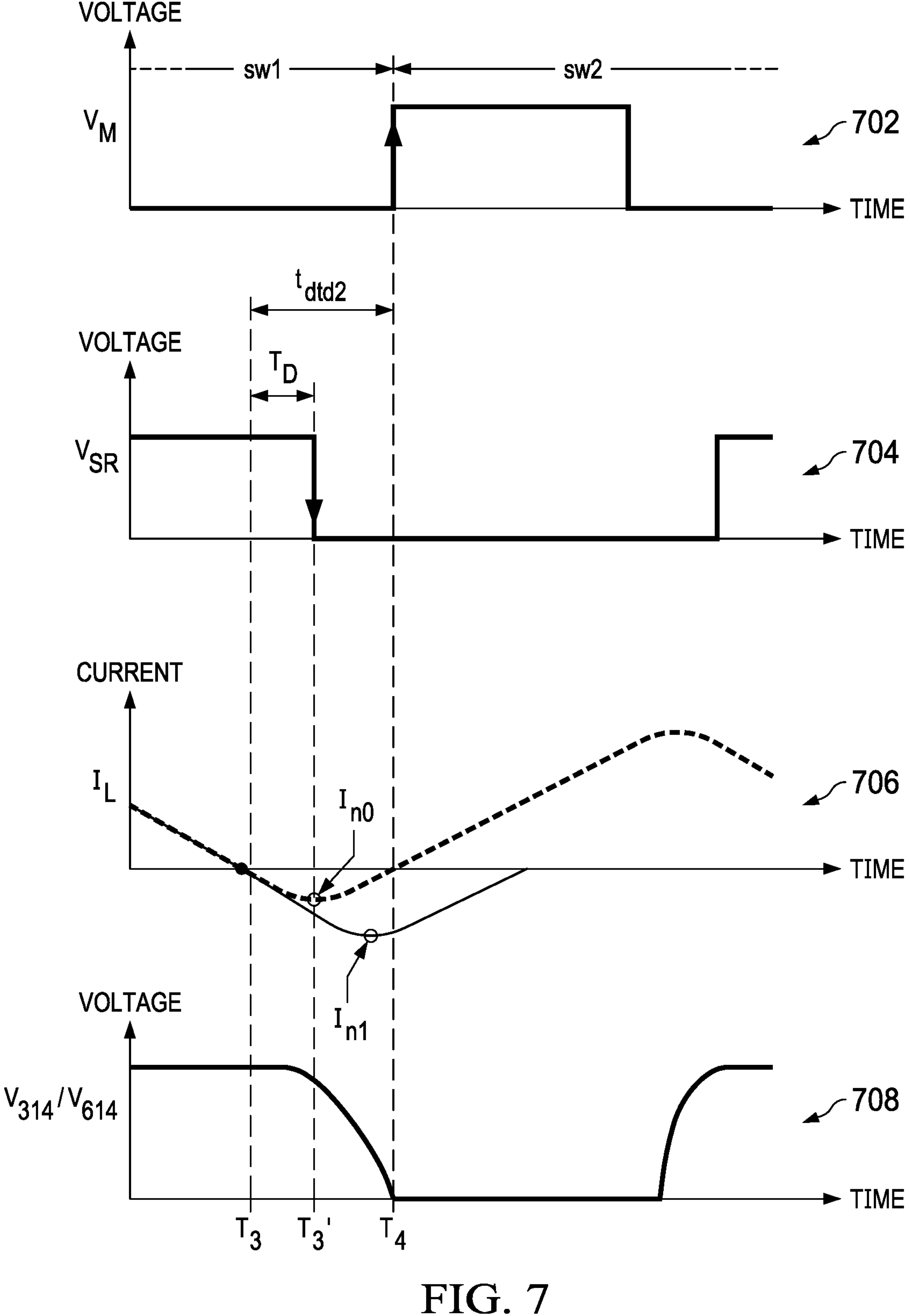
FIGS. 7 through 9 are waveform diagrams that illustrate example operations of the power supply system of FIG. 3 and FIG. 6.

FIG. 7 includes graphs 702, 704, 706, and 708 that illustrate example operations of power converter circuit 122 between two switching cycles and the effect of delay in the adjustment of $V_{SR}$ control signal. Graph 702 illustrates the variation of $V_M$ control signal with respect to time, and graph 704 illustrates the variation of $V_{SR}$ control signal with respect to time. Also, graph 706 illustrates the variation of inductor current with respect to time, and graph 708 illustrates the variation of voltage of node 314/614 with respect to time. The time notations are based on FIG. 4.

As shown in FIG. 7, towards the end of first switching cycle sw1, at time $T_3$ the inductor current crosses zero. The controller can disable the SR switch at time $T_3$ to provide an SR turn-off current sufficient to cause node 314/614 to complete transition to one of the power supply rails. If the SR switch is disabled at time $T_3$, the negative inductor current can peak at $I_{n0}$. But because of a delay TD, the SR switch is disabled at time $T_3'$. As a result, the inductor current becomes more negative after time $T_3$, and reaches a peak of $I_{n1}$.

Various sources can contribute to and increase the delay TD. For example, circuits involved in the inductor current measurement, such as current sensor and an ADC, have limited bandwidth and can incur delay in providing the current measurement data to the controller. The controller can also incur delay in computing the amount of a target SR turn-off current of the switching cycle based on the AC input voltage and the DC output voltage, and determining whether to disable the SR switch by comparing the target SR turn-off current with the inductor current indicated by the current measurement data. Further, the controller may include circuits, such as a pulse width modulator (PWM) circuit and a driver circuit, to generate and transmit the control signals to the main switch and the SR switch. Those circuits can also incur additional delay in generating the control signals.

The additional negative peak inductor current can increase current ripple, which can incur additional power loss and increase distortions in the AC input current. Specifically, the average current of each switching cycle is based on the negative peak current and the positive peak current $I_{p,peak}$ of the switching cycle. If the negative peak current becomes more negative compared with a target negative peak current of the switching cycle, the average AC input current across the switching cycles may no longer follow the AC input voltage, which can lead to substantial distortion.

To reduce the distortion, the controller may increase the positive peak current of that switching cycle (e.g., by increasing the turn-on interval of the main switch, $t_M$, to match the negative peak current. Such arrangements can maintain the shape of the average inductor current across switching cycles, and the average inductor current can have the a constant relationship with the AC input voltage. But increasing the positive peak current in each switching cycle can lead to additional power drawn from the AC power source, and much of the additional power is lost due to the negative inductor current that does not flow to the load. This can increase the power loss in power supply system 104 and reduce the efficiency of the power transfer from AC power source 102 to load 106.

Figure 8:
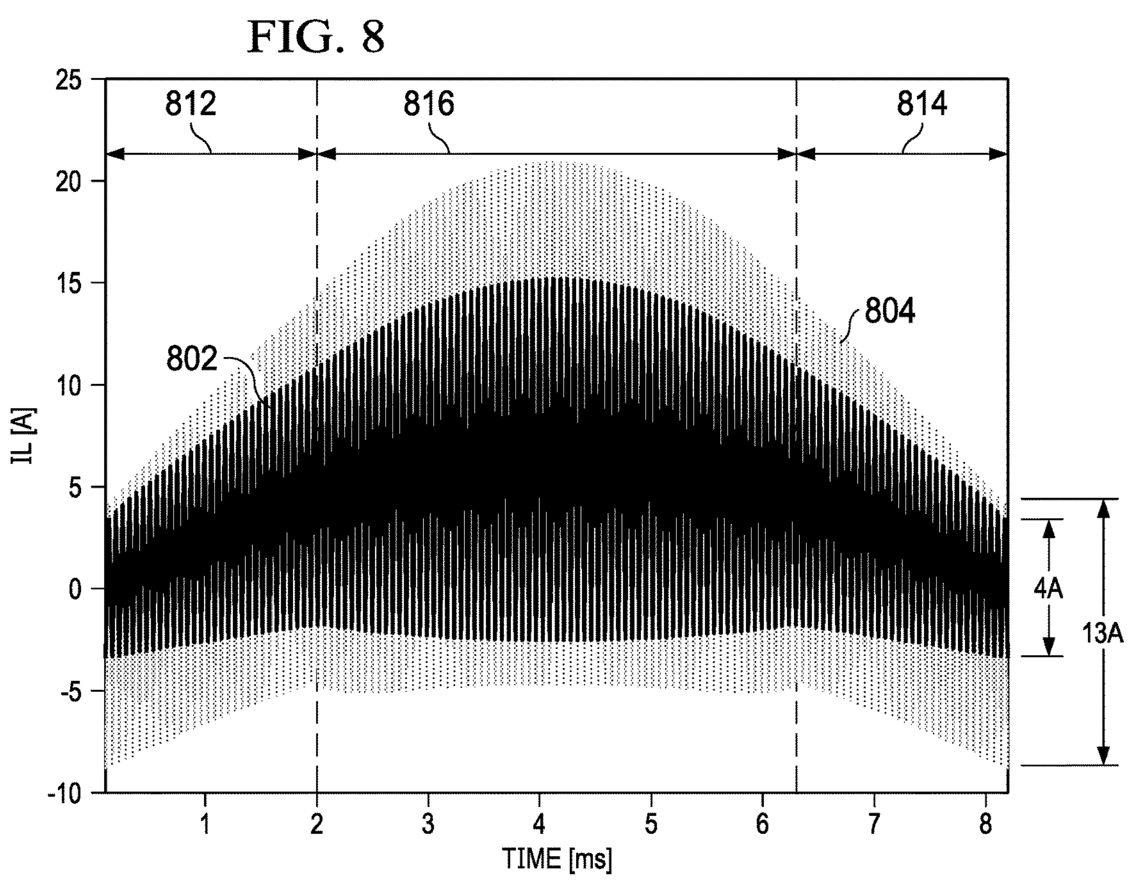

FIG. 8 illustrates graphs 802 and 804 of example variation of inductor current of power supply system 104 with respect to time. Graph 802 illustrates the variation of inductor current without the delay TD within a half-cycle of the AC input voltage, and graph 804 illustrates the variation of inductor current with a delay TD of about 100 nanoseconds (ns) within the same half-cycle. Referring to FIG. 8, within intervals 812 and intervals 814 close to the zero AC input voltage, the inductor current has larger current ripples in graph 804 than in graph 802. For example, at the beginning and end of the half-cycle, the maximum current ripple is at 4 Amperes (A) without the delay, but with the delay the maximum current ripple is at 13A. Also, the current ripples within interval 816 at the center of the half-cycle, where the AC input voltage and current are higher than intervals 812 and 814, are similar between graphs 802 and 804. Also, within interval 816, the DC output voltage $V_{out}$ exceeds half of AC input voltage $V_{in}$. In the operation of graph 802, there is no delay TD, but the controller can extend the turn-on interval of the SR switch and provide additional negative inductor current to discharge the main switch in the second resonant interval, as described above. In graph 804, the delay TD can also extend the turn-on interval of the SR switch ($t_{SR}$) to provide the additional negative inductor current. Accordingly, the current ripples in graphs 802 and 804 can be similar within interval 816. But the increased current ripples in intervals 812 and 814 (a maximum 3× increase in FIG. 8) can substantially increase the power loss in power supply system 104 and reduce the efficiency of the power transfer from AC power source 102 to load 106.

Also, referring again to FIG. 7, after determining that SR switch is to be disabled at $T_3$, the controller may determine the duration of the second dead time interval ($t_{dt2}$) to provide time for the voltage of node 314/614 to transition to one of the power supply rails, and determine that the main switch is to be enabled to start the next switching cycle (sw2) at time $T_4$, to achieve ZVS for the main switch, while reducing the interval in which the body diode of the main switch conducts the inductor current as in FIG. 4. The controller can determine the second resonant interval $t_{res2}$ based on the SR turn-off current (the inductor current when the SR switch is disabled), the input voltage ($V_{in}$ of FIG. 6 or $V_{in,dc}$ of FIG. 3), the output voltage $V_{out}$, as well as the resonant frequency of inductor 306 with the parasitic capacitance of the main switch and the SR switch at the switching node, as described above, and dynamically changes the duration of the second dead time interval $t_{dt2}$ to match or accommodate the second resonant interval $t_{res2}$ between different switching cycles.

Figure 9:
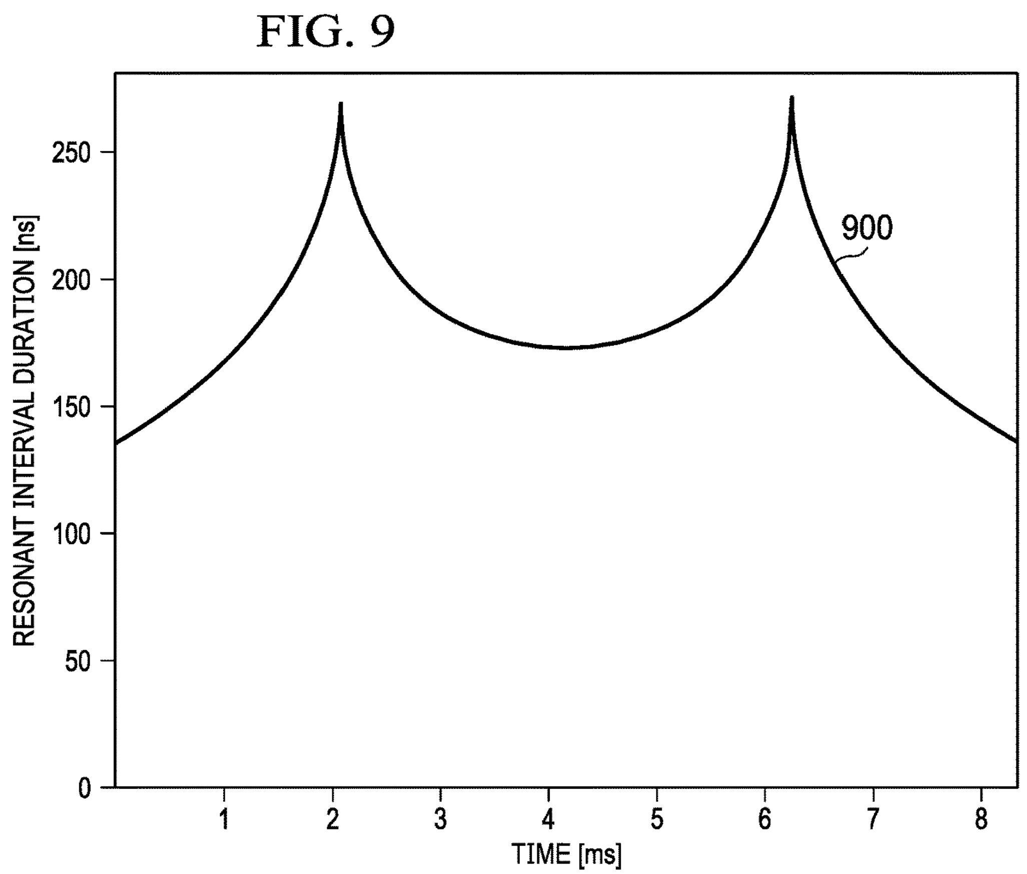

FIG. 9 illustrates a graph 900 of example variations of the durations of the second resonant interval $t_{res2}$ with respect to time within a half-cycle of the AC input voltage. In the operation represented in FIG. 9, a minimum amount of SR turn-off current that allows the switching node (e.g., nodes 314/614) to transition to one of the power supply rails is provided in each switching cycle. Also, the minimum second resonant interval is provided in each switching cycle for the switching node to complete the transition, and the duration of the second resonant interval varies according to the SR turn-off current. The second dead time interval duration ($t_{dt2}$) is also adjusted to match the second resonant interval in each switching cycle. In the example of FIG. 9, $t_{res2}$ can be at the minimum at the beginning and end of the half-cycle. Between 0 to about 2 milliseconds (ms), the controller can set the turn-on interval of the SR switch ($t_{SR}$) to have zero SR turn-off current, and $t_{res2}$ can increase with the AC input voltage and peaks at about 0.28 ms. Between 2 ms to 4.1 ms, the controller can extend the turn-on interval of the SR switch to increase the negative SR turn-off current, and $t_{res2}$ can decrease. The extension of the turn-on interval of the SR switch increases with the AC input voltage and is at the maximum at 4.1 ms. Between 4.1 ms and 6.5 ms, the extension of the turn-on interval of the SR switch reduces with the AC input voltage, which reduces the negative SR turn-off current and increases $t_{res2}$. Between 6.5 ms and 8.2 ms (end of the half-cycle), the controller can set the turn-on interval of the SR switch $t_{SR}$ such that there is zero SR turn-off current, and $t_{res2}$ can reduce with the AC input voltage.

The operations represented in graph 900, where the controller adjusts the duration of the second dead time interval $t_{dt2}$ in each switching cycle based on the minimum SR turn-off current to match the varying second resonant interval, can use lots of power in sensing, processing, and computation, yet are also error prone, which can reduce the efficiency of the power converter. Specifically, in order to adjust the duration of the second resonant interval in each switching cycle, the controller may receive measurements of the SR turn-off current from a current sensor in each switching cycle and perform computations to determine the resonant time based on the SR turn-off current, and the dead time to accommodate the resonant time. But this may require the current sensor to have a high bandwidth and a high accuracy, and such a current sensor can consume lots of power. Moreover, computing the duration of the second dead time interval can be computation intensive, and performing such computations in each switching cycle can also lead to substantial power consumption by the controller.

Also, adjusting the duration of the second dead time interval based on SR turn-off current can be error prone. Specifically, the controller may determine the durations of on-time of the SR switch $t_{SR}$, as well as the durations of the second dead time interval $t_{dt2}$ (and the second resonant interval), based on measuring the SR turn-off current, which can be represented by the inductor current when the SR switch is disabled. However, as described above, the circuits involved in the inductor current detection, such as current sensor and ADC, have limited bandwidth and can incur delay in providing the current measurement data to the controller. Because of the delay, the current measurement data used by the controller to determine $t_{dt2}$ may not reflect the actual inductor current when the SR switch is disabled, which can introduce errors in the determination of $t_{SR}$ and $t_{dt2}$. If $t_{dt2}$ is too short, the controller may enable the main switch prior to the voltage of node 314/614 transitioning to one of the power supply rails, which leads to non-ZVS and can incur additional power loss in the switching of the main switch. Also, if $t_{dt2}$ is too long, the controller may enable the main switch long after the voltage of node 314/614 transitions to one of the power supply rails. This can cause the inductor current to flow through the body diode of the main switch (e.g., diode 316 of FIG. 3, diode 616 of FIG. 6 in the positive half cycle, diode 626 of FIG. 6 in the negative half cycle), as between $T_4$ and $T_5$ of FIG. 4. As the body diode has a larger resistance than the enabled main switch, a larger power loss can be incurred which reduces the efficiency of power supply system 104.

Figure 10:
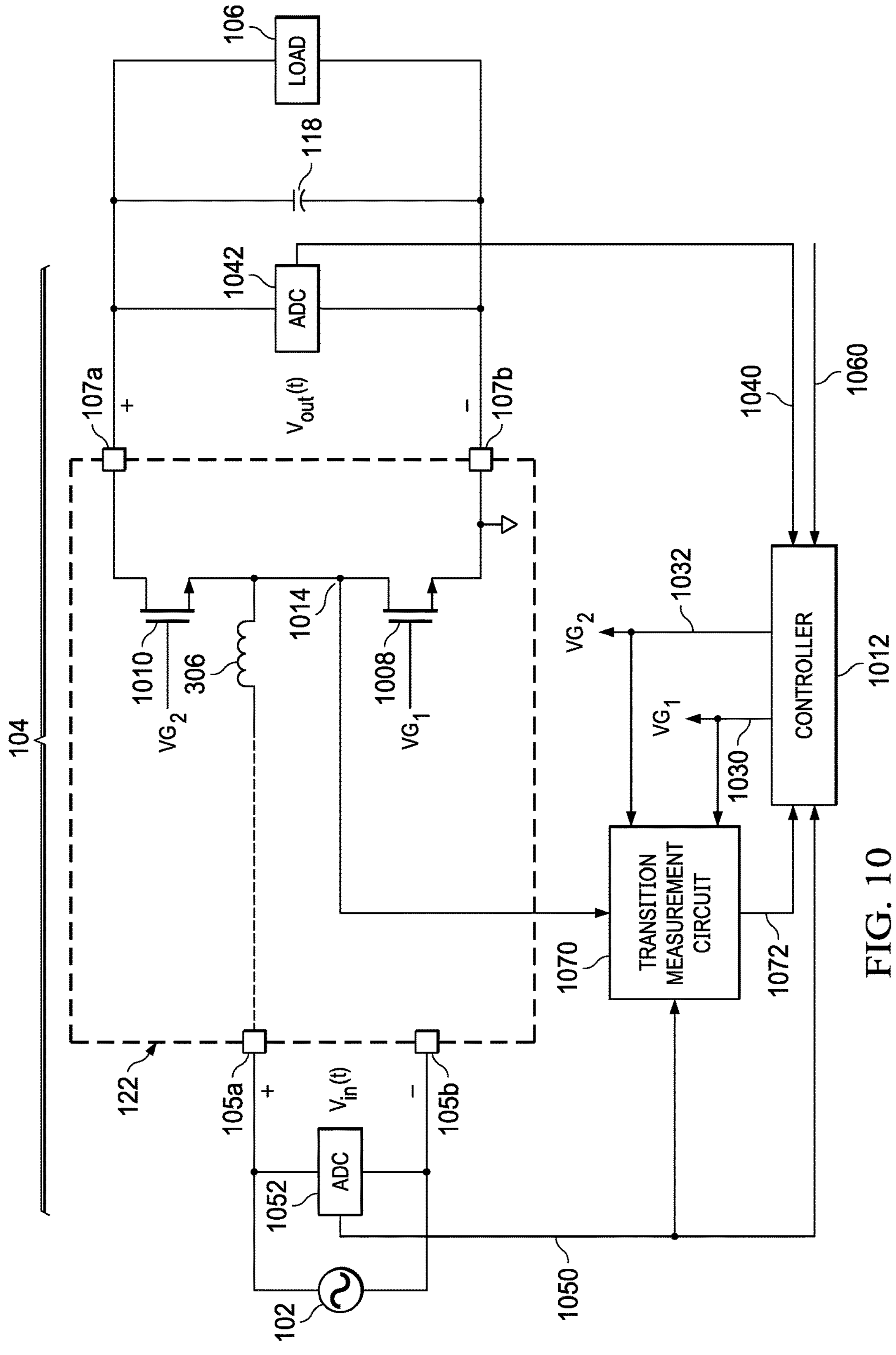
FIG. 10 is a schematic diagram of an example power supply system that can be part of the electric power transfer system of FIG. 1.

FIG. 10 is a schematic diagram of power converter circuit 122 that can address at least some of the issues described above. Referring to FIG. 10, power converter circuit 122 can include inductor 306, a switch 1008, and a switch 1010, and a controller 1012 coupled to power converter circuit 122. Controller 1012 can control switches 1008 and 1010. Controller 1012 can be part of a microcontroller (MCU), an application specific integrated circuit (ASIC), or a field-programmable gate array (FPGA). Inductor 306 and switches 1008 and 1010 can be coupled at a switching node 1014, and switches 1008 and 1010 can be coupled in series between positive output 107*a* and negative output 107*b*. In some examples, switches 1008 and 1010 can be part of boost converter of FIG. 3, where switches 1008 and 1010 correspond to, respectively, main switch 308 and SR switch 310 of FIG. 3, and inductor 306 is coupled to positive input 105*a* via rectifier circuit 120 (e.g., diode bridge 304). In some examples, switches 1008 and 1010 can also be part of a totem pole boost converter and correspond to, respectively, switch 602 and switch 604 of FIG. 6. Inductor 306 can be coupled directly to positive input 105*a*. In a positive half-cycle of AC input voltage signal 108, switch 1008 can operate as a main switch and switch 1010 can operate as an SR switch. In a negative half-cycle of AC input voltage signal 108, switch 1008 can operate as an SR switch and switch 1010 can operate as a main switch. In FIG. 10, the body diode and parasitic capacitances of switches 1008 and 1010 are omitted for simplicity.

Controller 1012 can generate control signal 1030 (labelled $V_{G1}$ in FIG. 10) to enable/disable switch 1008 and control signal 1032 (labelled $V_{G2}$ in FIG. 10) to enable/disable switch 1010 in each switching cycle. As in FIG. 4, in a case where controller 1012 operates switch 1008 as a main switch and switch 1010 as an SR switch, controller 1012 can include a first dead time interval ($t_{dt1}$) between the end of turn-on interval of switch 1008 and the start of turn-on interval of switch 1010 within a switching cycle, and a second dead time interval ($t_{dt2}$) between the end of the turn-on interval of switch 1010 and the start of turn-on interval of switch 1008 of two adjacent switching cycles. Also, in a case where controller 1012 operates switch 1010 as a main switch and switch 1008 as an SR switch, controller 1012 can include a first dead time interval ($t_{dt1}$) between the end of turn-on interval of switch 1010 and the start of turn-on interval of switch 1008 within a switching cycle, and a second dead time interval ($t_{dt2}$) between the end of the turn-on interval of switch 1008 and the start of turn-on interval of switch 1010 of two adjacent switching cycles.

In some examples, to simplify the computations involved in determining the timing of the $V_{G1}$ and $V_{G2}$ control signals, controller 1012 can preconfigure the duration of the second dead time interval at a constant value within a cycle of AC input voltage signal 108 ($V_{in}$), while the first dead time interval can also be kept constant (and at a minimum) as the parasitic capacitances of the main and SR switches are charged/discharged by the peak inductor current. In some examples, controller 1012 can preconfigure the duration of the second dead time interval based on a programming value. As controller 1012 needs not compute the duration of the second dead time interval for each switching cycle, the computations involved in determining the timing of the $V_{G1}$ and $V_{G2}$ control signals can be substantially reduced. Controller 1012 can adjust the turn-on interval of the SR switch ($t_{SR}$) to adjust the SR turn-off current such that switching node 1014 can complete transition to a target voltage (e.g., one of the positive/negative power supply rails) within the second dead time interval, so that the enabling of the main switch can be under the ZVS condition. Such arrangements also allow the second resonant interval $t_{res2}$ to be maintained at a constant value across different switching cycles within a cycle of the AC input voltage signal. In a case where switch 1010 operates as an SR switch, controller 1012 can adjust the turn-on interval of switch 1010 to enable switching node 1014 to complete transition to the negative power supply rail at the end of the second dead time interval, prior to switch 1008 (operating as the main switch) being enabled. In a case where switch 1008 operates an SR switch, controller 1012 can adjust the turn-on interval of switch 1008 to enable switching node 1014 to complete transition to the positive power supply rail at the end of the second dead time interval, prior to switch 1010 (operating as the main switch) being enabled.

Controller 1012 can receive measurements 1040 of DC output voltage signal 112 ($V_{out}(t)$) from a measurement circuit 1042 (e.g., ADC), measurements 1050 of AC input voltage signal 108 ($V_{in}(t)$) from a measurement circuit 1052 (e.g., an ADC), and a reference DC output voltage 1060. Controller 1012 can control the turn-on interval of the main switch ($t_M$) and the turn-on interval of SR switch 1010 ($t_{SR}$) based on the measurements and the reference to achieve a target DC output voltage signal 112. Also, controller 1012 can determine the duration of control signals $V_{G1}$ and $V_{G2}$ based on measurements of AC input voltage signal 108 to maintain a constant relationship between AC input current signal 110 and AC input voltage signal 108, as described above.

Also, power converter circuit 122 can include a transition measurement circuit 1070 to determine a status of transition of switching node 1014 when the main switch (one of switches 1008 or 1010) changes state at the beginning of a switching cycle. Transition measurement circuit 1070 can be coupled to switching node 1014 and can receive at least one of control signal 1030 ($V_{G1}$) or control signal 1032 ($V_{G2}$) from controller 1012. Based on the voltage of switching node 1014, transition measurement circuit 1070 can determine, at the beginning of a switching cycle, whether switching node 1014 transitions to a target voltage (e.g., one of the positive or negative power supply rails) to achieve zero voltage switching (ZVS) of the main switch. Also, based on one of the control signals 1030 or 1032, transition measurement circuit 1070 can generate an indication signal 1072 indicating whether switching node 1014 completes the transition prior to controller 1012 enables the main switch. In some examples, transition measurement circuit 1070 can include a comparator to compare the voltage of switching node 1014 against a threshold based on the target voltage, and digital logic circuits to generate indication signal 1072 based on the output of the comparator and a timing of the control signal from controller 1012 targeted at the main switch (one of $V_{G1}$ or $V_{G2}$).

In a case where switches 1008 and 1010 are part of a boost converter where switch 1008 is a main switch and switch 1010 is an SR switch, transition measurement circuit 1070 can generate indication signal 1072 based on whether switching node 1014 transitions to the negative power supply rail prior to main switch 1008 being enabled by control signal $V_{G1}$. Also, in a case where switches 1008 and 1010 are part of a totem pole boost converter, transition measurement circuit 1070 can also receive measurements 1050 of AC input voltage signal 108. If power supply system 104 is in the positive half-cycle of the AC input voltage where switch 1008 operates as a main switch and switch 1010 operates as an SR switch, transition measurement circuit 1070 can generate indication signal 1072 based on whether switching node 1014 transitions to the negative power supply rail prior to main switch 1008 being enabled by control signal $V_{G1}$. If power supply system 104 is in the negative half-cycle of the AC input voltage where switch 1008 operates as an SR switch and switch 1010 operates as a main switch, transition measurement circuit 1070 can generate indication signal 1072 based on whether switching node 1014 transitions to the positive power supply rail prior to main switch 1010 being enabled by control signal $V_{G2}$.

Controller 1012 can adjust the duration of the turn-on interval of SR switch 1010 ($t_{SR}$) based on indication signal 1072. If indication signal 1072 indicates that switching node 1014 completes the transition prior to main switch 1008 changes from the disabled state to the enabled state, such an indication can reflect that the SR turn-off current is more than sufficient for the switching node to complete the transition within the second dead time interval $t_{dt2}$, controller 1012 can reduce $t_{SR}$ to generate less SR turn-off current, and the SR turn-off current can become less negative when the SR switch is disabled. But if indication signal 1072 indicates that switching node 1014 does not complete the transition prior to controller 1012 enables main switch 1008, such an indication can reflect that the SR turn-off current is insufficient for the switching node to complete the transition within $t_{dt2}$, and controller 1012 can increase $t_{SR}$ to increase the SR turn-off current, and the SR turn-off current can become more negative when the SR switch is disabled. With such arrangements, controller 1012 can adjust the $t_{SR}$ and SR turn-off current, so that switching node 1014 can complete transition to the target voltage (e.g., ground) within the second dead time interval $t_{dt2}$, including the case where and $t_{dt2}$ and $t_{res2}$ and are fixed across the switching cycles.

Figure 11:
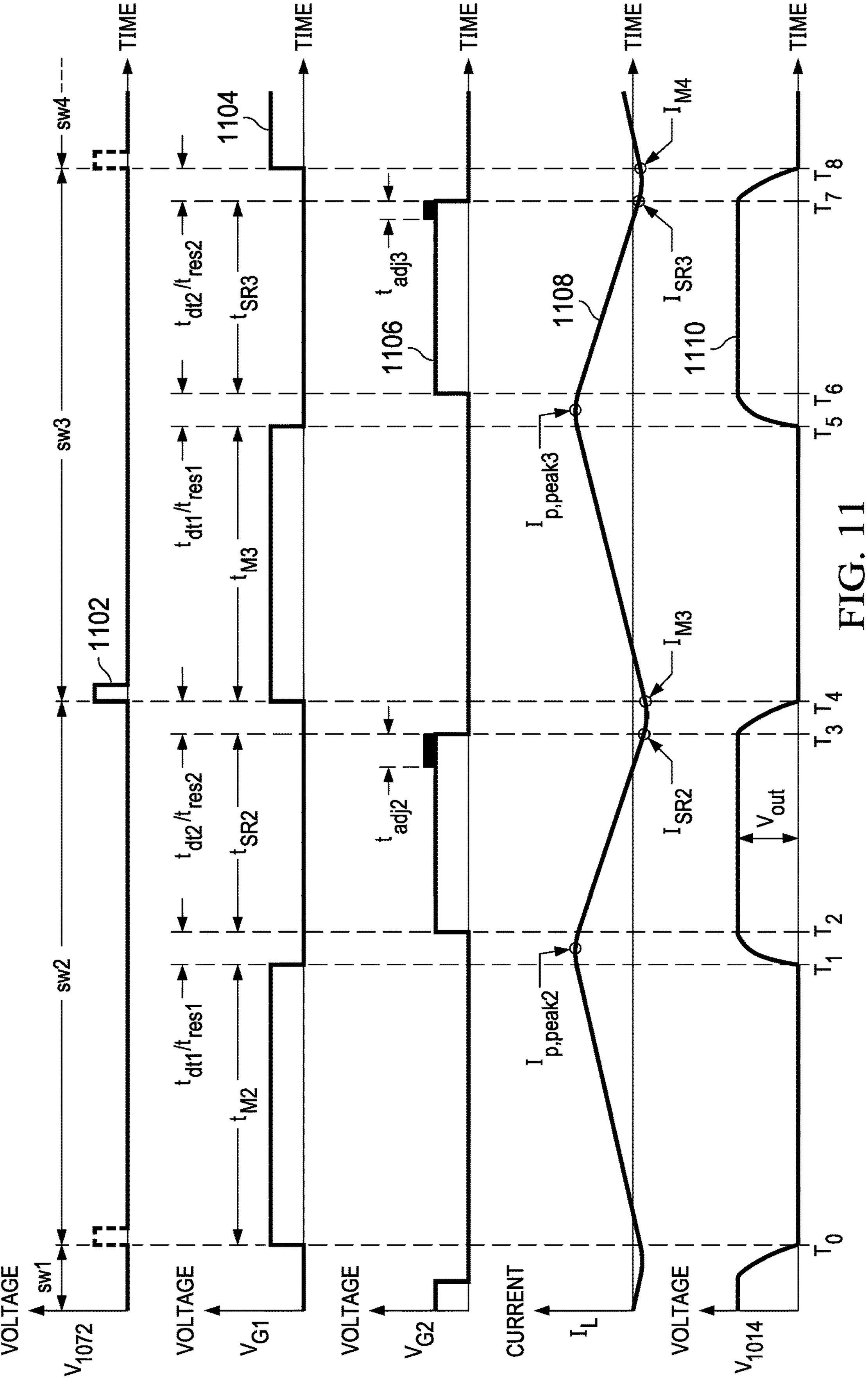
FIG. 11 includes waveform diagrams that illustrate example operations of the power supply system of FIG. 10.

FIG. 11 includes waveform diagrams that illustrate example operations of power converter circuit 122 operated by controller 1012 of FIG. 10. FIG. 11 includes graphs 1102, 1104, 1106, 1108, and 1110. Graph 1102 illustrates the variation of indication signal 1072 with respect to time. Graph 1104 illustrates the variation of control signal 1030 ($V_{G1}$) with respect to time, and graph 1106 illustrates the variation of control signal 1032 ($V_{G2}$) with respect to time, under the control of controller 1012. Also, graph 1108 illustrates the variation of inductor current that flows through inductor 306 with respect to time, which equals AC input current signal 110 ($I_{in}$), and graph 1110 illustrates the variation of voltage of node 1014 with respect to time. In the example operations represented in FIG. 11, controller 1012 operates switches 1008 and 1010 as, respectively, a main switch and an SR switch.

Referring to FIG. 11, the first switching cycle (sw1) ends at time $T_0$. At time $T_0$ when switch 1008 changes from the disabled state to the enabled state, and when the second switching cycle (sw2) starts, transition measurement circuit 1070 can generate an indication signal 1072 indicating that switching node 1014 does not complete the transition to the negative power supply rail (e.g., ground) prior to controller 1012 enables the main switch 1008. In some examples, indication signal 1072 can have a de-asserted state (e.g., a logical zero) to indicate that the transition is incomplete.

Controller 1012 can determine the turn-on interval of main switch 1008 ($t_{M2}$) and the turn-on interval of SR switch 1010 ($t_{SR2}$) in the second switching cycle based on the AC input voltage signal 108 at the second switching cycle ($V_{in}$(sw2)), DC output voltage signal 112 ($V_{out}$), and target DC voltage 160. Based on the de-asserted state of indication signal 1072, controller 1012 can increase $t_{SR2}$ of the second switching cycle with respect to the first switching cycle to increase the SR turn-off current. In the example of FIG. 11, $t_{SR2}$ can include an adjustment value $t_{adj2}$. As to be described below, controller 1012 can determine $t_{adj2}$ by increasing the adjustment value of the first switching cycle (sw1) based on indication signal 1072.

Within the second switching cycle, controller 1012 can set control signal $V_{G1}$ to a first state to enable main switch 1008 for the duration of $t_{M2}$ between $T_0$ and $T_1$ to charge inductor 306, and then set control signal $V_{G1}$ to low to disable main switch 1008 for the rest of the second switching cycle between $T_1$ and $T_4$. Controller 1012 can also set control signal $V_{G2}$ to a second state between $T_0$ and $T_2$ to disable SR switch 1010, and set control signal $V_{G2}$ to high to enable SR switch 1010 for the duration of $t_{SR2}$ between $T_3$ and $T_4$ to discharge inductor 306. As described above, in a case where switches 1008 and 1010 are NFETs, the $V_{G1}$ and $V_{G2}$ signals at the first state can be a gate voltage that exceeds the source voltage by at least a conduction threshold of the NFET, and the $V_{G1}$ and $V_{G2}$ signal at the second state can be a gate voltage that is below a sum of the source voltage and the conduction threshold.

Between $T_1$ and $T_2$ is a first dead time interval ($t_{dt1}$) of the second switching cycle when both main switch 1008 and SR switch 1010 are disabled. The first dead time interval can include a first resonant interval ($I_{res1}$) in which a positive peak charging inductor current of the second switching cycle ($I_{p,peak2}$) can charge switching node 1014 to the positive power supply rail ($V_{out}$). Also, between $T_3$ and $T_4$ is a second dead time interval ($t_{dt2}$) of the second switching cycle when both main switch 1008 and SR switch 1010 are again disabled. The second dead time interval can include a second resonant interval ($t_{res2}$) in which the negative discharging current (SR turn-off current $I_{SR2}$)) can discharge switching node 1014 to the negative power supply rail (ground). In FIG. 11, the durations of the first dead time interval and the second dead time interval can be fixed across switching cycles. The durations of the first resonant time interval and of the first dead time interval can be configured to be identical, and the durations of the second resonant time interval and of the second dead time interval can also be configured to be identical.

At $T_4$, controller 1012 sets control signal $V_{G1}$ to the first state to enable main switch 1008, and the third switching cycle (sw3) starts. The main switch turn-on current of the third switching cycle, which can be the inductor current when main switch 1008 is enabled, is labelled $I_{M3}$ in FIG. 11. The inductor current can ramp up from $I_{M3}$ within the turn-on interval of main switch 1008 ($t_{M3}$). As switching node 1014 completes transition to ground within the second resonant interval prior to main switch 1008 is enabled, transition measurement circuit 1070 can generate an indication signal 1072 at an asserted state at $T_4$ to indicate the complete transition. In some examples, as shown in FIG. 11, an indication signal 1072 that indicates complete transition can include a pulse signal.

Controller 1012 can determine the turn-on interval of main switch 1008 ($t_{M3}$) and the turn-on interval of SR switch 1010 ($t_{SR3}$) of the third switching cycle based on the AC input voltage signal 108 at the third switching cycle ($V_{in}$(sw3)), DC output voltage signal 112 ($V_{out}$), and target DC voltage 160. Based on indication signal 1072 having an asserted state, controller 1012 can decrease $t_{SR3}$ with respect to $t_{SR2}$ of the second switching cycle to decrease the SR turn-off current. In the example of FIG. 11, $t_{SR3}$ can include an adjustment value $t_{adj3}$. Controller 1012 can determine $t_{adj3}$ by decreasing the adjustment value $t_{adj2}$ of the second switching cycle (sw2) based on indication signal 1072.

Within the third switching cycle, controller 1012 can set control signal $V_{G1}$ to the first state to enable main switch 1008 for the duration of $t_{M3}$ between $T_4$ and $T_5$, and then set control signal $V_{G1}$ to the second state to disable main switch 1008 for the rest of the second switching cycle between $T_5$ and $T_8$. Controller 1012 can also set control signal $V_{G2}$ to the second state between $T_4$ and $T_6$ to disable SR switch 1010, and set control signal $V_{G2}$ to the first state to enable SR switch 1010 for the duration of $t_{SR3}$ between $T_6$ and $T_7$. Between $T_5$ and $T_6$ is a first dead time interval ($t_{dt1}$) of the third switching cycle, which can also be the first resonant interval) in which node 1014 is charged up to $V_{out}$ by a positive peak inductor current of the third switching cycle ($I_{p,peak3}$). Between $T_7$ and $T_8$ is a second dead time interval ($t_{td2}$) of the third switching cycle, which can also be the second resonant interval ($t_{dt2}$) in which a negative SR turn-off current of the third switching cycle ($I_{SR3}$) discharges node 1014 to ground. The duration of the first dead time intervals of the second and third switching cycles can be identical, and the duration of the second dead time intervals of the second and third switching cycles can also be identical, as described above. In the example of FIG. 11, as the SR turn-off current cannot discharge switching node 1014 to ground before the second resonant interval ends, transition measurement circuit 1070 can generate a de-asserted indication signal 1072 at $T_8$ when the fourth switching cycle (sw4) starts, which can cause controller 1012 to increase the turn-on interval of the SR switch and the SR turn-off current in the fourth switching cycle. Inductor current can start to ramp up from the main switch turn-on current $I_{M4}$ of the fourth switching cycle.

As described above, the adjustment of the duration of the SR switch turn-on time $t_{SR}$ of a switching cycle can be based on indication signal 1072 received from a prior switching cycle. For example, in FIG. 11, the adjustment of $t_{SR}$ of a switching cycle (e.g., a $k^{th}$ switching cycle) can be based on indication signal 1072 received from an adjacent preceding switching cycle (e.g., a (k−1)th switching cycle). In some examples, the adjustment of $t_{SR}$ of the $k^{th}$ cycle can be based on other prior switching cycles, such as (k−2)th cycle and (k−3)th cycle. Such arrangements can allow more time (e.g., at least one switching cycle period, or more) for the generation of indication signal 1072 and the computation of $t_{SR}$ based on indication signal 1072, and the generation of the $V_{SR}$ control signal. Accordingly, transition measurement circuit 1070 and controller 1012 can have lower bandwidth and can consume less power. Also, as the switching cycle is much shorter than the half-cycle of AC input voltage signal 108, the SR turn-off current needed for switching node 1014 to complete transition within the second resonant interval can be similar between neighboring switching cycles. Accordingly, the indication of whether the SR turn-off current is sufficient for the switching node to complete transition in one switching cycle can be used to adjust the SR turn-off current and the $t_{SR}$ of subsequent switching cycles.

Also, generating indication signal 1072 to indicates whether node 1014 completes transition to a target voltage within a second dead time interval of a prior switching cycle, and adjusting $t_{SR}$ accordingly, can also relax the bandwidth and accuracy requirements of transition measurement circuit 1070 and reduce the computations involved in controlling main switch 1008 and SR switch 1010. Specifically, as described above, one way to adjust $t_{SR}$ is by using a current measurement circuit to measure the inductor current, and the current measurement circuit may include a current sensor and an ADC. Based on the inductor current, the controller can determine the SR turn-off current needed for the switching node to complete the transition within the second resonant interval, as well as the duration of the second resonant interval $t_{res2}$, can vary between switching cycles as shown in FIG. 9. But the current sensor and the ADC may need to have a high bandwidth and a high accuracy, and may consume lots of power. Also, computing the SR turn-off current and $t_{SR}$ and $t_{res2}$ in each and every switching cycle are also computation intensive and may also consume lots of power.

In contrast, with the arrangements of FIG. 10 and FIG. 11, indication signal 1072 can be generated based on a binary decision from a comparator that compares the voltage of switching node 1014 against a threshold. The bandwidth and accuracy requirements of the comparator can be much less than those of the current sensor and ADC of a current measurement circuit, and the comparator can consume much less power. Also, as described above, with the duration of the second dead time interval (and the second resonant interval) fixed at least within a cycle of the AC input voltage signal, controller 1012 needs not compute the second resonant interval, and adjust the second dead time interval to accommodate the second resonant interval, in every switching cycle, and the computations of controller 1012 in operating main switch 1008 and SR switch 1010 can be reduced. All these can reduce the power loss of power supply system 104 and improve its efficiency.

Figure 12:
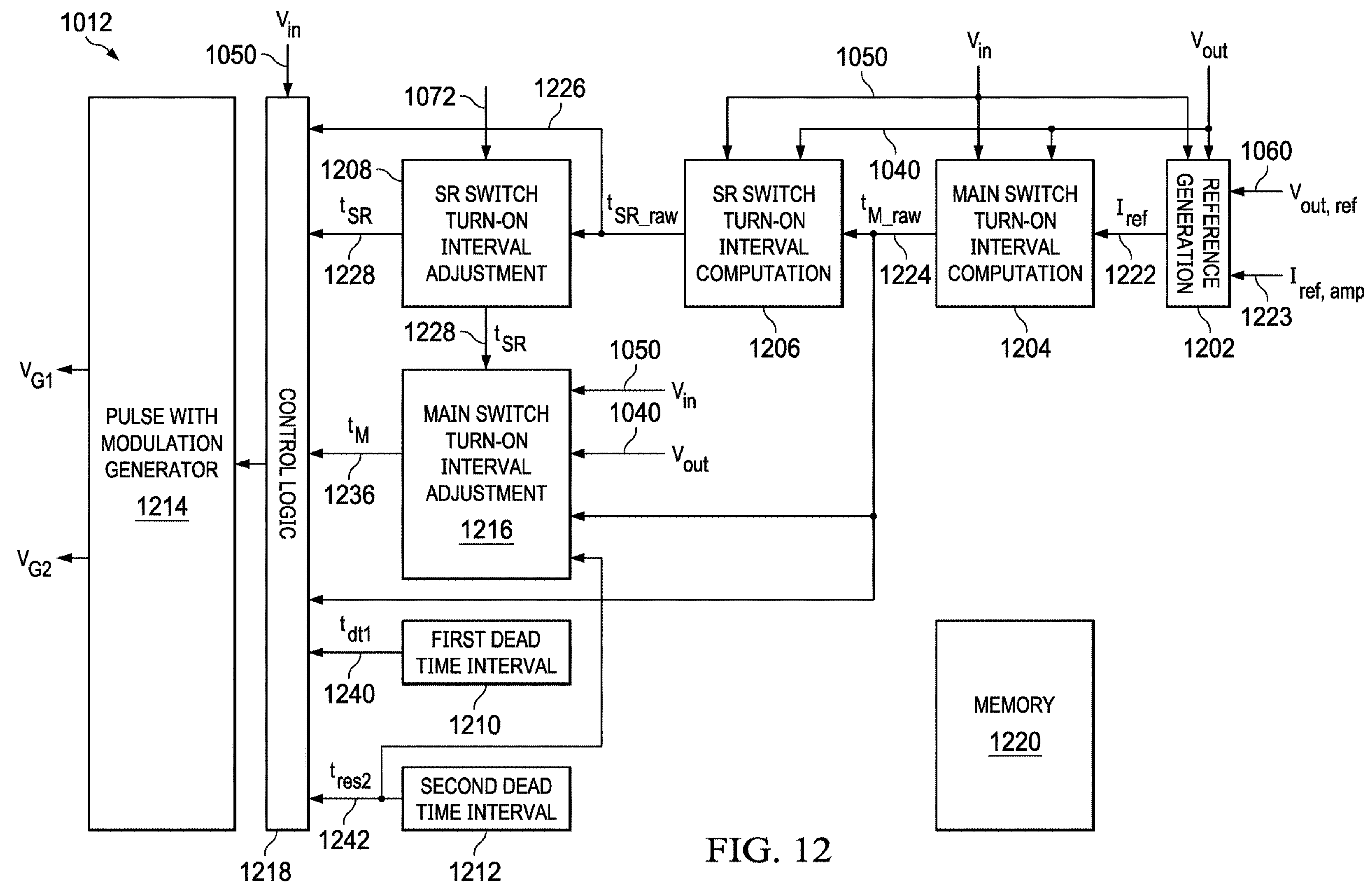
FIG. 12 is a schematic diagram that illustrates examples of internal components of the power supply system of FIG. 10.

FIG. 12 is a schematic diagram of example internal components of controller 1012. As shown in FIG. 12, controller 1012 can include a reference generation module 1202, a main switch turn-on interval computation module 1204, an SR switch turn-on interval computation module 1206, an SR switch turn-on interval adjustment module 1208, a first dead time interval module 1210, a second dead time interval module 1212, and a pulse width modulation (PWM) generator circuit 1214. In some examples, controller 1012 may also include a main switch turn-on interval adjustment module 1216. Controller 1012 further includes a control logic module 1218 to control the operations of these components, and a memory 1220 to support the operations. As described above, controller 1012 can be part of a microcontroller (MCU), an application specific integrated circuit (ASIC), a programmable logic circuit such as field-programmable gate army (FPGA). Memory 1220 can include volatile and/or non-volatile memory, such as static random access memory (SRAM), dynamic random access memory (DRAM), flash memory, erasable programmable read-only memory (EPROM). In a case where controller 1012 is an MCU, each of modules 1202-1218 can be a software module executable by the MCU, and memory 1220 can store the instructions of each module executable by the MCU. In a case where controller 1012 is an ASIC or a FPGA, each of modules 1202-1218 can be a circuit module including logic circuits. Memory 1220 can also provide storage for the input data and output data for each of module.

Reference generation module 1202 can generate a digital value 1222 representing the magnitude of a reference current $I_{ref}$. The reference current can represent a target of the AC input current 110 ($I_{in}(t)$) and can be a sinusoidal current signal having the same frequency and phase as AC input voltage signal 108 ($V_{in}$), to maintain a power factor equal to or substantially close to one. The reference current information can also be provided by an outer control loop to control power supply system 104 to provide a DC output voltage that matches the reference DC output voltage.

Reference generation module 1202 can generate $I_{ref}$ in various ways. In some examples, reference generation module 1202 can receive, from the output control loop, a digital value 1223 representing the peak value or the amplitude of reference current, $I_{ref,amp}$. Reference generation module 1202 can also receive measurements 1050, determine a normalized $V_{in}$ (e.g., having an amplitude of 1V) from measurements 1050, and generate digital value 1222 of $I_{ref}$ by multiplying $I_{ref,amp}$ with the normalized $V_{in}$. In some examples, reference generation module 1202 can also receive measurements 1040 representing DC output voltage signal 112 ($V_{out}$) and reference DC output voltage 1060 ($V_{out,ref}$). Reference generation module 1202 can include a subtraction circuit to generate a difference between DC output voltage signal 112 and reference DC output voltage 1060, and a proportional integration (PI) controller to generate $I_{ref,amp}$ internally based on the difference. Reference generation module 1202 can then generate digital value 1222 of $I_{ref}$ by multiplying $I_{ref,amp}$ with the normalized $V_{in}$ from measurements 1050.

Main switch turn-on interval computation module 1204 can generate a digital value 1224 representing a raw turn-on interval duration of the main switch for a switching cycle ($t_{M\_raw}$). The raw turn-on interval can be for one of switches 1008 or 1010 operating as the main switch. Within a $k^{th}$ switching cycle, main switch turn-on interval computation module 1204 can receive measurements 1050 of AC input voltage signal 108 of the switching cycle ($V_{in}(k)$) and measurements 1040 of DC output voltage signal 112 of the switching cycle ($V_{out}(k)$). If the magnitude of $V_{in}(k)$ is less than or equal to half of the magnitude of $V_{out}(k)$, main switch turn-on interval computation module 1204 can compute $t_{M\_raw}(k)$ for the $k^{th}$ switching cycle based on the following Equation:

$$t_{M\_raw}(k) = \frac{2|I_{ref}(k)| \cdot L_r}{|V_{in}(k)|} + \frac{V_{out}(k) - |V_{in}(k)|}{|V_{in}(k)|} \cdot \sqrt{L_r C_r} \quad \text{(Equation 7)}$$

In Equation 7, $|I_{ref}(k)|$ can represent the magnitude/absolute value of reference current at the $k^{th}$ switching cycle, $|V_{in}(k)|$ can represent the magnitude/absolute value of AC input voltage signal 108 at the $k^{th}$ switching cycle, $L_r$ can be the inductance of inductor 306, and $C_r$ can be the total parasitic capacitances of switches 1008 and 1010 at node 1014.

If the magnitude of $V_{in}(k)$ is greater than half of the magnitude of $V_{out}(k)$, main switch turn-on interval computation module 1204 can compute $t_{M\_raw}(k)$ for the $k^{th}$ switching cycle based on the following Equation:

$$t_{M\_raw}(k) = \frac{2|I_{ref}(k)| \cdot L_r}{|V_{in}(k)|} \cdot \sqrt{L_r C_r} \quad \text{(Equation 8)}$$

The first term of Equations 7 and 8, $$\frac{2|I_{ref}(k)| \cdot L_r}{|V_{in}(k)|},$$

can represent the time to ramp the inductor current from zero to a target peak current that tracks the AC input voltage to perform power factor correction, and the target peak current can track $I_{ref}$. The ramp time can be based on a ratio between the inductance and the AC input voltage, and the ratio can define the rate of change of inductor current. As $I_{ref}(k)$ tracks $V_{in}(k)$, the first term can be substantially constant across switching cycles, similar to $t_M$ in FIG. 5. Further, the $\sqrt{L_r C_r}$ term, where $L_r$ is the inductance of inductor 306 and $C_r$ is the total parasitic capacitances of switches 1008 and 1010 at switching node 1014, can represent an extra period of time to ramp the inductor current from the negative SR turn-off current in the second resonant interval of the preceding switching cycle (k−1) to zero. Such arrangements can improve the correlation between the $t_{M\_raw}$ with the AC input voltage of the switching cycle, which can reduce the harmonic distortions present in the average inductor current and the input current 110, $I_{in}(t)$.

Also, the $\sqrt{L_r C_r}$ term in Equation 7 is scaled down compared with Equation 8. This can be because the power converter may provide less SR turn-off current to charge/discharge switching node 1014 within the second resonant interval if the absolute value of $V_{in}(k)$ is less than or equal to half of $V_{out}(k)$, therefore the extra period provided to ramp the inductor current is scaled down by a factor of $$\frac{V_{out}(k) - |V_{in}(k)|}{|V_{in}(k)|}$$

in Equation 7, compared with a case where $V_{in}(k)$ exceeds equal to half of $V_{out}(k)$ as represented in Equation 8.

After computing $t_{M\_raw}(k)$, main switch turn-on interval computation module 1204 can provide digital value 1224 representing $t_{M\_raw}(k)$ to SR switch turn-on interval computation module 1206. In some examples, main switch turn-on interval computation module 1204 can provide digital value 1224 to control logic module 1218, which can control PWM generator circuit 1214 to generate one of control signals $V_{G1}$ or $V_{G2}$ to have a turn-on interval equal to $t_{M\_raw}(k)$. For example, if switch 1008 operates as the main switch, PWM generator circuit 1214 can generate $V_{G1}$ to have a turn-on interval equal to $t_{M\_raw}(k)$. If switch 1010 operates as the main switch, PWM generator circuit 1214 can generate $V_{G2}$ to have a turn-on interval equal to $t_{M\_raw}(k)$. In some examples, main switch turn-on interval computation module 1204 can also provide $t_{M\_raw}(k)$ to main switch turn-on interval adjustment module 1216, which can further adjust $t_{M\_raw}(k)$.

SR switch turn-on interval computation module 1206 can receive measurements 1050 of AC input voltage signal 108 of the switching cycle ($V_{in}(k)$), measurements 1040 of DC output voltage signal 112 ($V_{out}(k)$), and digital value 1224 representing $t_{M\_raw}(k)$, and compute a raw turn-on interval duration of the SR switch for the switching cycle, $t_{SR\_raw}(k)$, based on the following Equation:

$$t_{SR\_raw}(k) = \frac{|V_{in}(k)| \cdot t_{M\_raw}(k)}{V_{out}(k) - |V_{in}(k)|} \quad \text{(Equation 9)}$$

In Equation 9, a ratio between $t_{SR\_raw}(k)$ and $t_{M\_raw}(k)$, which can determine the duty cycle of a boost converter, can be based on a ratio between the magnitude/absolute value of AC input voltage signal 108 ($V_{in}(k)$) and a difference between the DC output voltage and the magnitude/absolute value of the AC input voltage, $V_{out}(k)-|V_{in}(k)|$. SR switch turn-on interval computation module 1206 can compute $t_{SR\_raw}$ based on measurements 1040 and 1050, the absolute value of digital value 1224, and Equation 9, and provide a digital value 1226 representing $t_{SR\_raw}(k)$.

SR switch turn-on interval adjustment module 1208 can receive digital value 1226 representing $t_{SR\_raw}(k)$ and indication signal 1072, and compute the actual turn-on interval of SR switch of the $k^{th}$ switching cycle, $t_{SR}(k)$. $T_0$ compute $t_{SR}(k)$, SR switch turn-on interval adjustment module 1208 can first compute an adjustment value of the $k^{th}$ switching cycle, $t_{adj}(k)$, and add the adjustment value to the raw turn-on interval of the SR switch $t_{SR\_raw}(k)$ as follows:

$$t_{SR}(k)=t_{SR\_raw}(k)+t_{adj}(k) \quad \text{(Equation 10)}$$

SR switch turn-on interval adjustment module 1208 can compute the adjustment value of the $k^{th}$ switching cycle from the adjustment value of a previous switching cycle for which indication signal 1072 is generated. In a case where indication signal 1072 is generated in the neighboring prior (k−1)th switching cycle, SR switch turn-on interval adjustment module 1208 can read, from memory 1220, adjustment value of the (k−1)th switching cycle, adj(k−1), which can be based on the following Equation:

$$t_{adj}(k-1)=t_{SR}(k-1)-t_{SR\_raw}(k-1) \quad \text{(Equation 11)}$$

SR switch turn-on interval adjustment module 1208 can then compute adj(k) from adj(k−1) based on adding or subtracting an offset $T_S$. If indication signal 1072 is low, which indicates that switching node 1014 does not transition to the target voltage (one of the positive or negative power supply rails) within the second resonant interval, SR switch turn-on interval adjustment module 1208 can compute adj(k) by adding $T_S$ to $tad_j(k-1)$ as follows:

$$t_{adj}(k)=t_{adj}(k-1)+T_S \quad \text{(Equation 12)}$$

On the other hand, if indication signal 1072 is high, which indicates that switching node 1014 transitions to the target voltage within the second resonant interval, SR switch turn-on interval adjustment module 1208 can compute $t_{adj}$ (k) by subtracting $T_S$ from $tad_j(k-1)$ as follows:

$$t_{adj}(k)=t_{adj}(k-1)-T_S \quad \text{(Equation 13)}$$

After computing $t_{adj}(k)$, SR switch turn-on interval adjustment module 1208 can store $t_{adj}(k)$ in memory 1220 to be used in future switching cycles. SR switch turn-on interval adjustment module 1208 can also compute the $t_{SR}(k)$ by adding $t_{adj}(k)$ to $t_{SR\_raw}(k)$, and generate a digital value 1228 representing $t_{SR}(k)$. SR switch turn-on interval adjustment module 1208 can transmit digital value 1228 to control logic module 1218, which can control PWM generator circuit 1214 to generate the other one of control signals $V_{G1}$ or $V_{G2}$ to have a turn-on interval equal to $t_{SR}(k)$. For example, if switch 1008 operates as the SR switch, PWM generator circuit 1214 can generate $V_{G1}$ to have a turn-on interval equal to $t_{SR}(k)$. If switch 1010 operates as the SR switch, PWM generator circuit 1214 can generate $V_{G2}$ to have a turn-on interval equal to $t_{SR}(k)$.

In some examples, as described above, SR switch turn-on interval adjustment module 1208 can also compute the adjustment value $t_{adj}(k)$ based on indication signal 1072 and adjustment values of other prior switching cycles, such as (k−2)th cycle and (k−3)th cycle. For example, controller 1012 can first compute $t_{SR}(k)$ based on $t_{SR\_raw}(k)$ and $tad_j(k-1)$, and then compute $t_{adj}(k)$ based on indication signal 1072 received from the (k−1)th cycle, and provide $t_{adj}(k)$ for computation of $t_{SR}(k+1)$ of the (k+1)th cycle. Such arrangements can provide for more time to generate indication signal 1072 and computation of $t_{SR}$.

In some examples, SR switch turn-on interval adjustment module 1208 can also compute the adjustment value $t_{adj}(k)$ based on indication signals 1072 of multiple cycles. For example, the adjustment value $t_{adj}(k)$ can be increased if an asserted indication signal 1072 is received in at least a certain number of consecutive switching cycles before the $k^{th}$ cycle. Also, $t_{adj}(k)$ can be decreased if a de-asserted indication signal 1072 is received in at least a certain number of consecutive switching cycles before the $k^{th}$ cycle. Such arrangements can reduce the frequency of updating the adjustment value and the associated computations at controller 1012. Moreover, such arrangements can also reduce changes in the adjustment values across consecutive switching cycles where the SR turn-off current can be almost identical, which in turn can reduce the ripples in the inductor currents in the consecutive switching cycles.

In some examples, the $T_S$ offset can be a fixed value across the switching cycles. As an example, the $T_S$ offset can be set at a certain percentage (e.g., 5%) of the cycle period of the AC input voltage. In some examples, the $T_S$ offset can be dynamically increased or decreased across the switching cycles based on indication signal 1072. For example, if controller 1012 has added a $T_S$ offset to the adjustment value of a certain number of consecutive switching cycles, and indication signal 1072 after those consecutive switching cycles remain de-asserted, this can indicate that switching node 1014 still cannot transition to the target voltage within the second resonant interval despite the successive increases in $t_{SR}$ and the SR turn-off current. Accordingly, controller 1012 can increase $T_S$ to further speed up the increases in $t_{SR}$ and the SR turn-off current in subsequent switching cycles. Also, if controller 1012 has subtracted a $T_S$ offset from the adjustment value of a certain number of consecutive switching cycles, and indication signal 1072 after those consecutive switching cycles remain asserted, this can indicate that the SR turn-off current remains excessive despite the successive decreases in $t_{SR}$ and the SR turn-off current. Accordingly, controller 1012 can also increase $T_S$ to further speed up the decreases in $t_{SR}$ and the SR turn-off current in subsequent switching cycles. On the other hand, if controller 1012 detects alternating increment and decrement of $T_S$ over a certain number of consecutive switching cycles, this may indicate that a steady state is reached, and controller 1012 may decrease $T_S$ to narrow range of the adjustment value in the steady state.

Main switch turn-on interval adjustment module 1216 can compute the actual turn-on interval of the main switch of the $k^{th}$ cycle, $t_M(k)$, based on adjusting $t_{M\_raw}(k)$ from main switch turn-on interval computation module 1204 using $t_{SR}(k)$ from SR switch turn-on interval adjustment module 1208. The adjustment of $t_{M\_raw}(k)$ can revise the ramp time of the positive inductor current to account for a revised estimate of the negative SR turn-off current from $t_{SR}(k)$. Such arrangements can further improve the correlation between $t_{M\_raw}$ (and the peak inductor current) with the AC input voltage, which can reduce the harmonic distortions present in the average inductor current and the AC input current signal 110, $I_{in}(t)$, including when the AC input voltage is near zero.

Main switch turn-on interval adjustment module 1216 can compute, for the $k^{th}$ switching cycle, the revised SR turn off current $I_{SR\_turnoff}(k)$ and the main switch turn-on current $I_M(k)$ at the end of the second resonant interval of the (k−1)th cycle based on $I_{SR\_turnoff}(k)$. Main switch turn-on interval adjustment module 1216 can then compute the duration of an extension interval of the main switch turn-on interval, $t_{M\_SR}(k)$, as follows:

$$I_{SR\_turnoff}(k)=\frac{t_{M\_raw}(k)\cdot|V_{in}(k)|-(V_{out}(k)-|V_{in}(k)|)\cdot t_{SR}(k)}{L_r} \quad \text{(Equation 14)}$$

$$I_n(k)=\frac{|V_{in}(k)|-V_{out}(k)}{Z_n}\cdot a+I_{SR\_turnoff}(k)\cdot b \quad \text{(Equation 15)}$$

$$a=\sin(\omega_r\cdot t_{res2}) \quad \text{(Equation 16)}$$

$$b=\cos(\omega_r\cdot t_{res2}) \quad \text{(Equation 17)}$$

$$\omega_r=\frac{1}{\sqrt{L_rC_r}} \quad \text{(Equation 18)}$$

$$Z_n=\sqrt{\frac{L_r}{C_r}} \quad \text{(Equation 19)}$$

$$t_{M\_SR}(k)=\frac{-I_n(k)\cdot L_r}{V_{in}(k)} \quad \text{(Equation 20)}$$

In Equations 14 through 20, $L_r$ is the inductance of inductor 306, $C_r$ is the total parasitic capacitances of switches 1008 and 1010 at switching node 1014, and $t_{res2}$ is duration of the second resonant interval, which can be a preconfigured value.

Main switch turn-on interval adjustment module 1216 can then compute the actual turn-on interval of main switch $t_M$ by adding the extension interval $t_{M\_SR}(k)$ to the raw turn-on interval $t_{M\_raw}(k)$ as follows:

$$t_M(k)=t_{M\_raw}(k)+t_{M\_SR}(k) \quad \text{(Equation 21)}$$

After computing the actual turn-on interval of main switch $t_M$, main switch turn-on interval adjustment module 1216 can transmit a digital value 1236 to control logic module 1218, which can control PWM generator circuit 1214 to generate one of $V_{G1}$ or $V_{G2}$ to have the turn-on interval equal to $t_M$, as described above.

First dead time interval module 1210 can provide a digital value 1240 representing the duration of the first dead time interval $t_{dt1}$ to control logic module 1218, and second dead time interval module 1212 can provide a digital value 1242 representing the duration of the second dead time interval $t_{dt2}$ to control logic module 1218 and to main switch turn-on interval adjustment module 1216. Main switch turn-on interval adjustment module 1216 can receive second dead time interval $t_{dt2}$ and determine the second resonant interval duration $t_{res2}$ based on $t_{dt2}$, such as by setting $t_{res2}$ as equal to $t_{dt2}$ or by adding a timing margin to $t_{dt2}$. Both first dead time interval module 1210 and second dead time interval module 1212 can be part of memory 1220 which can be programmed to store digital values 1240 and 1242.

The first dead time interval $t_{dt1}$ and the second dead time interval $t_{dt2}$ can be determined based on various techniques. For example, first dead time interval module 1210 can be configured to store a digital value 1240 that is no less than the maximum duration of the first resonant interval $t_{res1}$ across the switching cycles. The first resonant interval can be at the maximum when the peak inductor current is at its minimum. Accordingly, digital value 1240, representing $t_{dt1}$, can be determined based on the lowest peak inductor current within a cycle of the AC input voltage, as well as inductance $L_r$ and capacitance $C_r$. Also, second dead time interval module 1210 can be configured to store a digital value 1242 that is no more than the minimum duration of the second resonant interval $t_{res2}$ across the switching cycles in a case where the minimum SR turn-off current for the switching node to transition to one of the power rails is provided in each switching cycle, as illustrated in FIG. 9. In the example of FIG. 9, the minimum duration of the second resonant interval $t_{res2}$ can be at around 140 nanoseconds (ns), and second dead time interval module 1210 can store a digital value 1242 representing a duration of 120 ns.

PWM generator circuit 1214 can generate digital values (e.g., logical one for the first state, a logical zero for the second state) representing control signals $V_{G1}$ and $V_{G2}$. PWM generator circuit 1214 can then transmit the digital values to a driver circuit (not shown in FIG. 12) to convert the digital values to analog voltage signals to drive switches 1008 and 1010. Control logic module 1218 can control PWM generator circuit 1214 to generate a sequence of control signals $V_{G1}$ and $V_{G2}$ with the timing defined by $t_{SR}$, $t_M$, $t_{dt1}$, and $t_{dt2}$.

In some examples, control logic module 1218 can include a state machine to control PWM generator circuit 1214 to generate control signals $V_{G1}$ and $V_{G2}$, and to control the read and write operations to memory 1220. The state machine can operate based on a counter and comparing the count values with digital values 1228, 1236, 1240, and 1242 representing, respectively, $t_{SR}$, $t_M$, $t_{dt1}$, and $t_{dt2}$. Control logic module 1218 can also receive measurements 1050 representing AC input voltage signal 108, determine whether the system operates in the positive half-cycle or in the negative half-cycle of the AC input voltage, and generate control signals $V_{G1}$ and $V_{G2}$ accordingly.

Figures 13A, 13B:
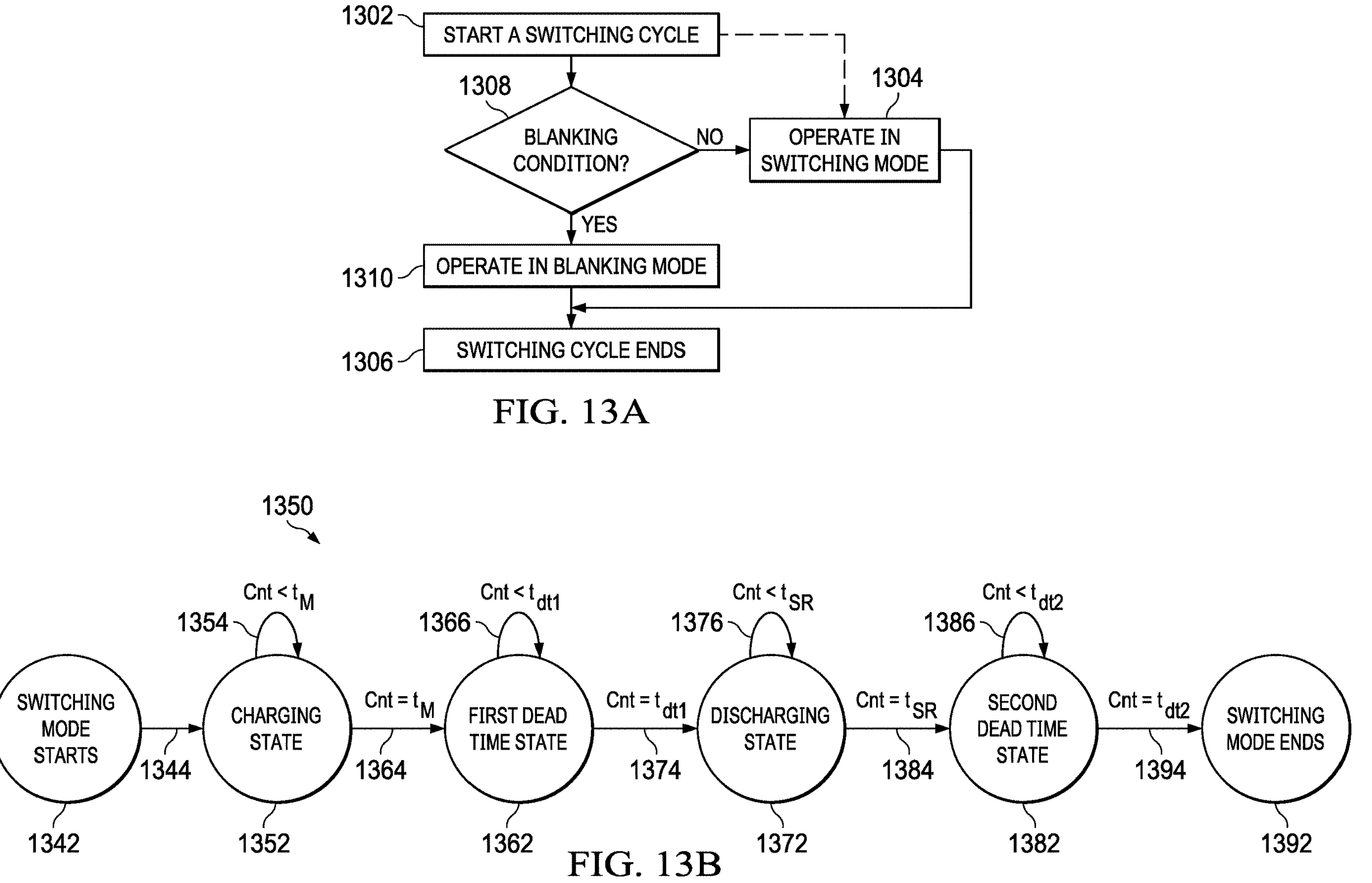
FIG. 13A and FIG. 13B are charts that illustrate example operations of the power supply system of FIG. 10.

FIG. 13A and FIG. 13B are charts that illustrate example operations of control logic module 1218. FIG. 13A illustrates a flowchart 1300. In operation 1302, control logic module 1218 starts a new switching cycle (e.g., $k^{th}$ switching cycle). In some examples, control logic module 1218 can then proceed directly to operation 1304 and operate in a switching mode, in which control logic module 1218 can control PWM generator circuit 1214 to transmit control signals $V_{G1}$ and $V_{G2}$ that toggle between the first state and the second state to operate switches 1008 and 1010 in the switching cycle. The operations of control logic module 1218 in the switching mode are to be described in FIG. 13B. The switching cycle then ends in operation 1306.

In some examples, after starting a new switching cycle, control logic module 1218 can detect a blanking condition, in operation 1308. The system can detect the blanking condition when the AC input voltage ($V_{in}$) approaches zero. If the blanking condition is not detected, control logic module 1218 can proceed to operation 1304 and enter the switching state. But if the blanking condition is detected, control logic module 1218 can operate in a blanking mode, in operation 1310. When in blanking mode, control logic module 1218 can disable both switches 1008 and 1010, which can reduce the input current $I_{in}$ as AC input voltage approaches or crosses zero. Such arrangements can avoid current spikes at the zero-crossing of the AC input voltage, which can maintain the power factor and reduce harmonic distortions. Control logic module 1218 can then proceed to operation 1306 and ends the switching cycle.

Control logic module 1218 can detect the blanking condition based on various techniques. For example, control logic module 1218 can receive measurements 1050 of AC input voltage signal 108 ($V_{in}$), determine a magnitude of the AC input voltage, compare the magnitude against a threshold voltage, and determine that the system operates in the blanking condition if the magnitude of the AC input voltage is below the threshold voltage. As another example, control logic module 1218 can receive digital values 1224, 1226, 1240 and 1242 representing, respectively, $t_{m,raw}$, $t_{SR,raw}$, $t_{dt1}$, and $t_{dt2}$, and determine a cycle period based on the sum of digital values. Control logic module 1218 can determine that the system operates in the blanking condition if the cycle period is above a threshold duration.

FIG. 13B illustrates an example state diagram 1350 of a state machine in control logic module 1218 when operating in the switching mode. Control logic module 1218 can reset a counter, and start in a state 1342 when switching mode starts. In some examples, control logic module 1218 can receive digital values 1236, 1228, 1240 and 1242 representing, respectively, $t_M$, $t_{SR}$, $t_{dt1}$, and $t_{dt2}$ while in state 1342. After receiving the digital values, control logic module 1218 can proceed to a charging state 1352 via an edge 1344.

When in charging state 1352, control logic module 1218 can first reset the counter, and control PWM generator circuit 1214 to set the control signal of the main switch (e.g., switch 1008) in the first state to enable the main switch, and set the control signal for the SR switch (e.g., switch 1010) in the second state to disable the SR switch. The counter can increment with respect to time, and control logic module 118/PWM generator circuit 1214 can remain in the charging state when the counter value is below digital value 1236 representing $t_M$, as indicated by a transition edge 1354.

When the counter value matches digital values 1224/1236, control logic module 1218 can reset the counter and transition to a first dead time state 1362 via a transition edge 1364. Within first dead time state 1362, PWM generator circuit 1214 sets both $V_{G1}$ and $V_{G2}$ to the second state. The counter can increment with respect to time after the reset is released, and control logic module 1218/PWM generator circuit 1214 can remain in the first dead time state when the counter value is below digital value 1240 representing the duration of the first dead time interval $t_{dt1}$, as indicated by a transition edge 1366.

When the counter value matches digital value 1240, control logic module 1218 can reset the counter and transition to a discharging state 1322 via a transition edge 1324. In discharging state 1372, PWM generator circuit 1214 can set the control signal of the main switch (e.g., switch 1008) in the second state to disable the main switch, and set the control signal of the SR switch (e.g., switch 1010) to the first state to enable the SR switch. The counter can increment with respect to time after the reset is released, and control logic module 1218/PWM generator circuit 1214 can remain in the discharging state when the counter value is below digital value 1228 representing the duration of the discharging interval $t_{SR}$, as indicated by a transition edge 1376.

When the counter value matches digital value 1228, control logic module 1218 can reset the counter and transition to a second dead time state 1382 via a transition edge 1384. Within second dead time state 1312, PWM generator circuit 1214 sets both control signals $V_{G1}$ and $V_{G2}$ to low. The counter can increment with respect to time after the reset is released, and PWM generator circuit 1214 can remain in the first dead time state when the counter value is below digital value 1242 representing the duration of the second dead time interval $t_{dt2}$, as indicated by a transition edge 1386. When the counter value reaches digital value 1242, control logic module 1218 can enter state 1392 where the switching mode ends via edge 1394.

Figure 14:
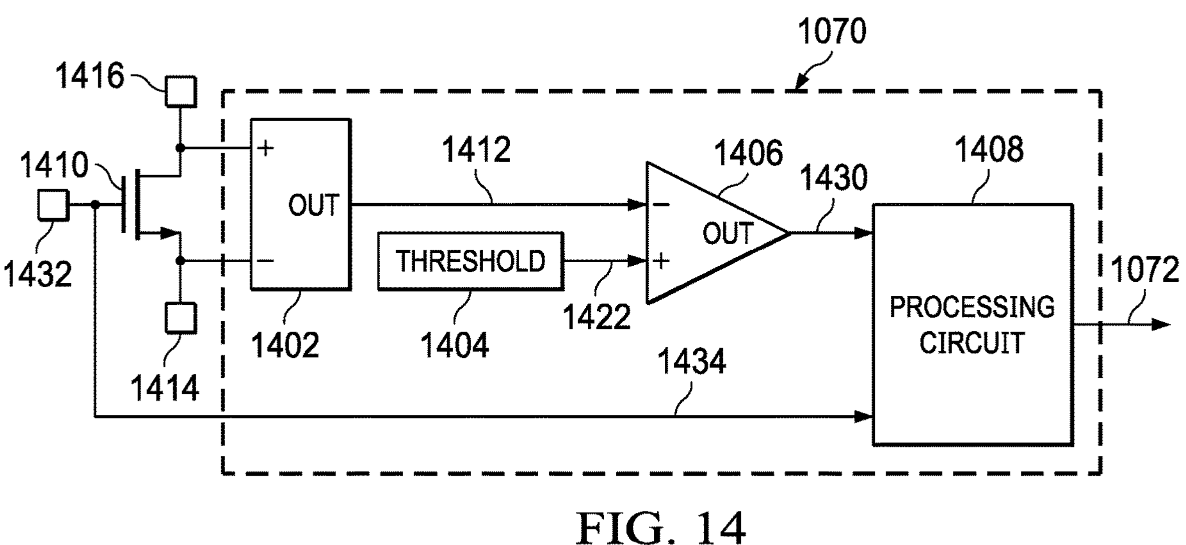
FIGS. 14 through 18 include schematic and waveform diagrams that illustrate examples of internal components of the power supply system of FIG. 10 and their operations.

FIGS. 14 through 18 illustrate examples of internal components of transition measurement circuit 1070 and their operations. Referring to FIG. 14, transition measurement circuit 1070 can include a voltage measurement circuit 1402, a threshold generator circuit 1404, a comparator 1406, and processing circuit 1408. Voltage measurement circuit 1402 can be coupled across a main switch 1410 of a power converter, which can be one of switches 1008 or 1010, to measure a voltage difference across main switch 1410. In a case where main switch 1410 includes a FET, voltage measurement circuit 1402 can provide a voltage signal 1412 based on a voltage difference between current terminals 1414 and 1416 (e.g., drain and source terminals) of the FET, where current terminal 1414 can be coupled to ground and current terminal 1416 can be coupled to a switching node (e.g., switching node 1014) and to an inductor (e.g., inductor 306). In some examples, voltage measurement circuit 1402 can include a differential amplifier to generate voltage signal 1412. Also, threshold generator circuit 1404 can output a threshold voltage 1422 representing a zero voltage difference across main switch 1410. Threshold voltage 1422 can be a voltage signal 1412 provided by voltage measurement circuit 1402 when the voltage difference is zero. Comparator 1406 can compare voltage signal 1412 against threshold voltage 1422 to provide a decision signal 1430, which indicates whether the voltage difference across main switch 1410 is zero. In the example of FIG. 14, comparator 1406 can provide a logical one for decision signal 1430 if the voltage difference between current terminals 1414 and 1416 equals or below zero, and provide a logical zero for decision signal 1430 if the voltage difference between current terminals 1414 and 1416 exceeds zero.

Also, processing circuit 1408 can be coupled to a control terminal 1432 of main switch 1410 (e.g., a gate terminal) and the output of comparator 1406. Processing circuit 1408 can generate indication signal 1072 based on decision signal 1430 and a control signal 1434 (e.g., one of $V_{G1}$ or $V_{G2}$) at control terminal 1432, to indicate whether main switch 1410 switches state after switching node 1014 transitions completely to ground, therefore there is a zero voltage difference across main switch 1410 and ZVS can be achieved. In some examples, processing circuit 1408 can include a pulse generator circuit.

Figure 15:
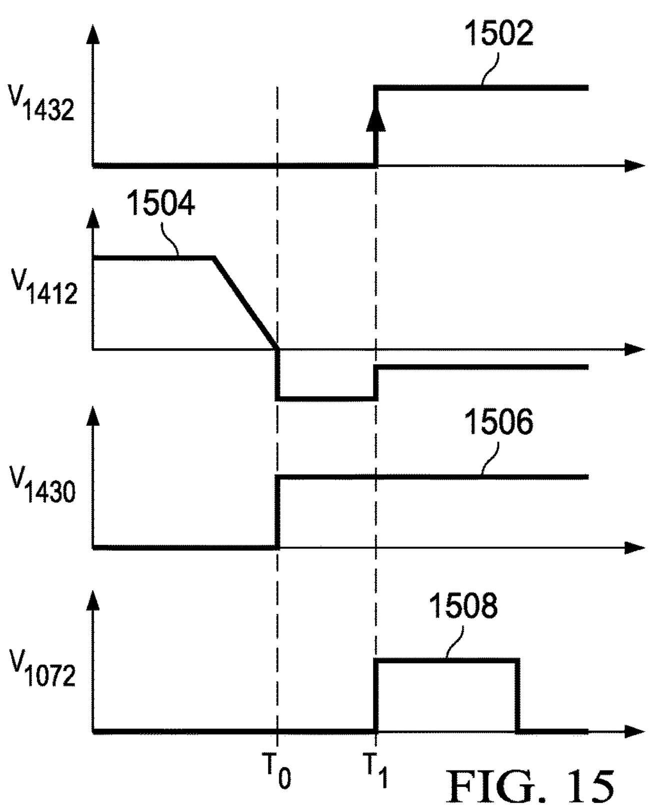
Figure 16:
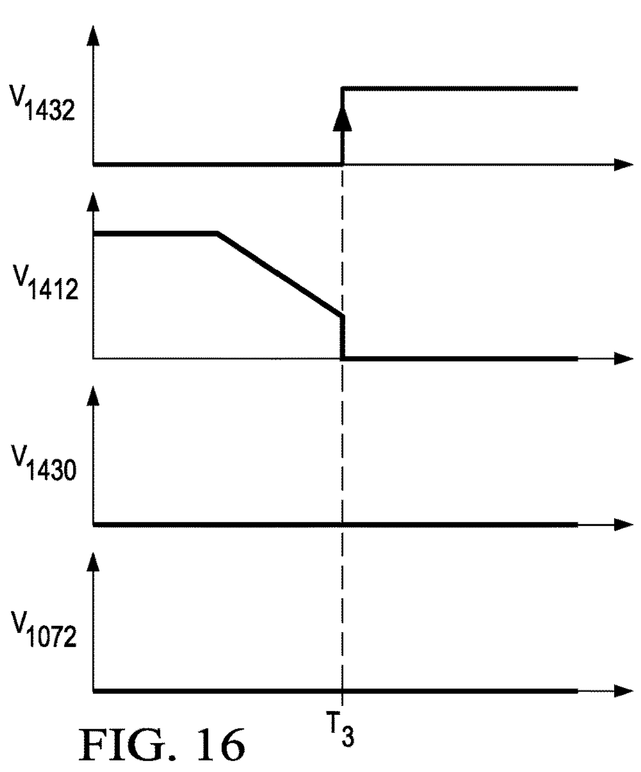

FIG. 15 and FIG. 16 illustrate graphs of signals 1412, 1434, 1430, and 1072 with respect to time, where indication signal 1072 is provided by the example transition measurement circuit 1070 of FIG. 14. FIG. 15 illustrates graphs 1502, 1504, 1506, and 1508 of, respectively, signals 1412, 1434, 1430, and 1072 in a case where indication signal 1072 indicates ZVS, and FIG. 16 illustrates graphs 1602, 1604, 1606, and 1608 of, respectively, signals 1412, 1434, 1430, and 1072 in a case where indication signal 1072 indicates non-ZVS.

Referring to FIG. 15, at time $T_0$, the voltage difference across main switch 1410 drops below zero, and signal 1412 also drops below threshold voltage 1422. This causes decision signal 1430 to be asserted at time $T_0$. The asserted decision signal 1430 can enable the pulse generator of transition measurement circuit 1070. At time $T_1$ after $T_0$, control signal 1432 changes from the second state to the first state to enable main switch 1410. The rising edge of control signal 1432 at $T_1$ can trigger the pulse generator to generate a pulse for indication signal 1072, and the pulse can indicate a ZVS condition, as main switch 1410 changes state when the voltage across the main switch is zero.

Referring to FIG. 16, at time $T_3$, control signal 1432 changes from the second state to the first state to enable main switch 1410 when the voltage difference across main switch 1410 is still above zero, and signal 1412 is above threshold voltage 1422. This causes decision signal 1430 to be de-asserted, which can disable the pulse generator of transition measurement circuit 1070. Accordingly, indication signal 1072 can be de-asserted, which can indicate a non-ZVS condition as main switch 1410 changes state when the voltage across the main switch is above zero.

Figure 17:
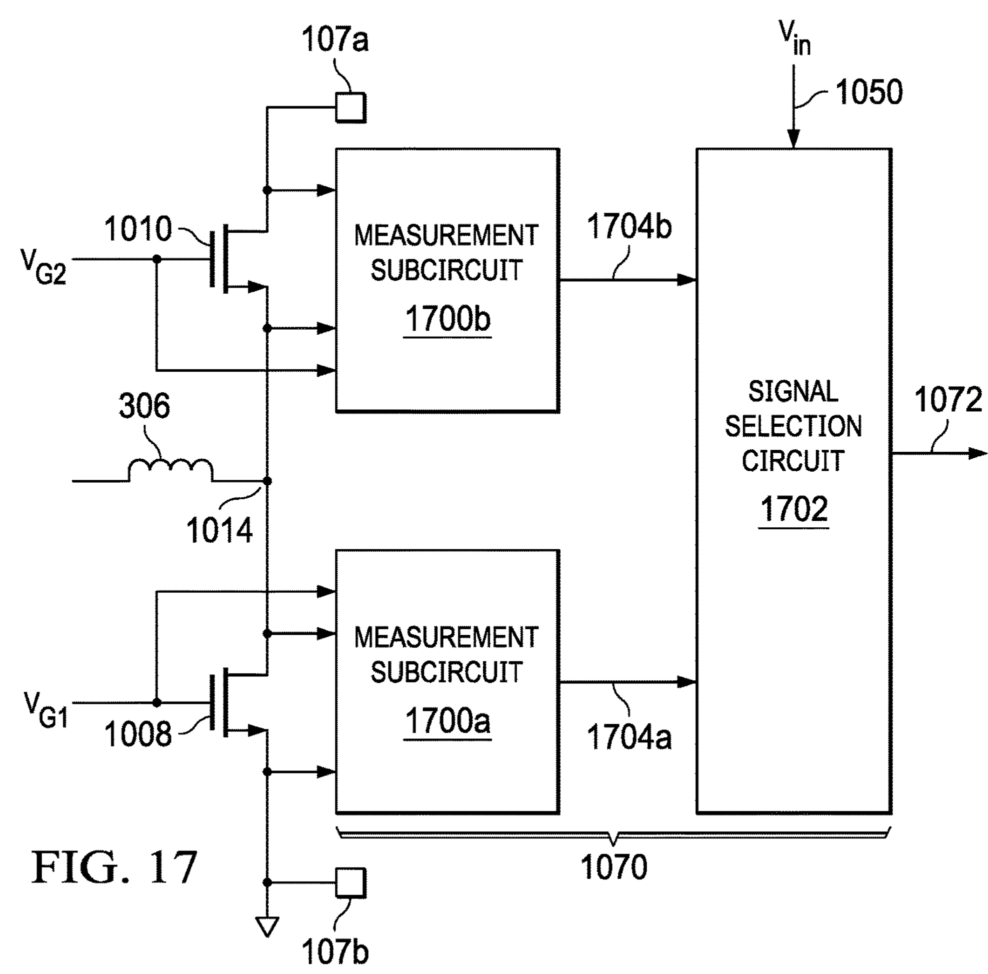

FIG. 17 illustrates an example of transition measurement circuit 1070 for power converter circuit 122 of FIG. 10 where switches 1008 and 1010 are configured as a totem pole boost converter. Referring to FIG. 17, transition measurement circuit 1070 can include a measurement sub-circuit 1700*a*, a measurement sub-circuit 1700*b*, and a signal selection circuit 1702. Each of measurement subcircuits 1700*a* and 1700*b* can have the example components shown in FIG. 14 including voltage measurement circuit 1402, threshold generator circuit 1404, comparator 1406, and processing circuit 1408. Measurement subcircuit 1700*a* can generate a signal 1704*a* indicating whether the voltage difference across switch 1008 drops to zero when $V_{G1}$ changes state and enables switch 1008. Measurement subcircuit 1700*b* can generate a signal 1704*b* indicating whether voltage difference across switch 1010 drops to zero when $V_{G2}$ changes state and enables switch 1010. Signal selection circuit 1702 can receive measurements 1050 of AC input voltage signal 108 ($V_{in}$) and forward one of signals 1704*a* or 1704*b* as indication signal 1072 based on whether the system operates in the positive or negative half-cycle of the AC input voltage. If the system operates in the positive half-cycle, switch 1008 operates as the main switch and signal selection circuit 1702 can forward signal 1704*a* as indication signal 1072. If the system operates in the negative half-cycle, switch 1010 operates as the main switch and signal selection circuit 1702 can forward signal 1704*b* as indication signal 1072.

Figure 18:
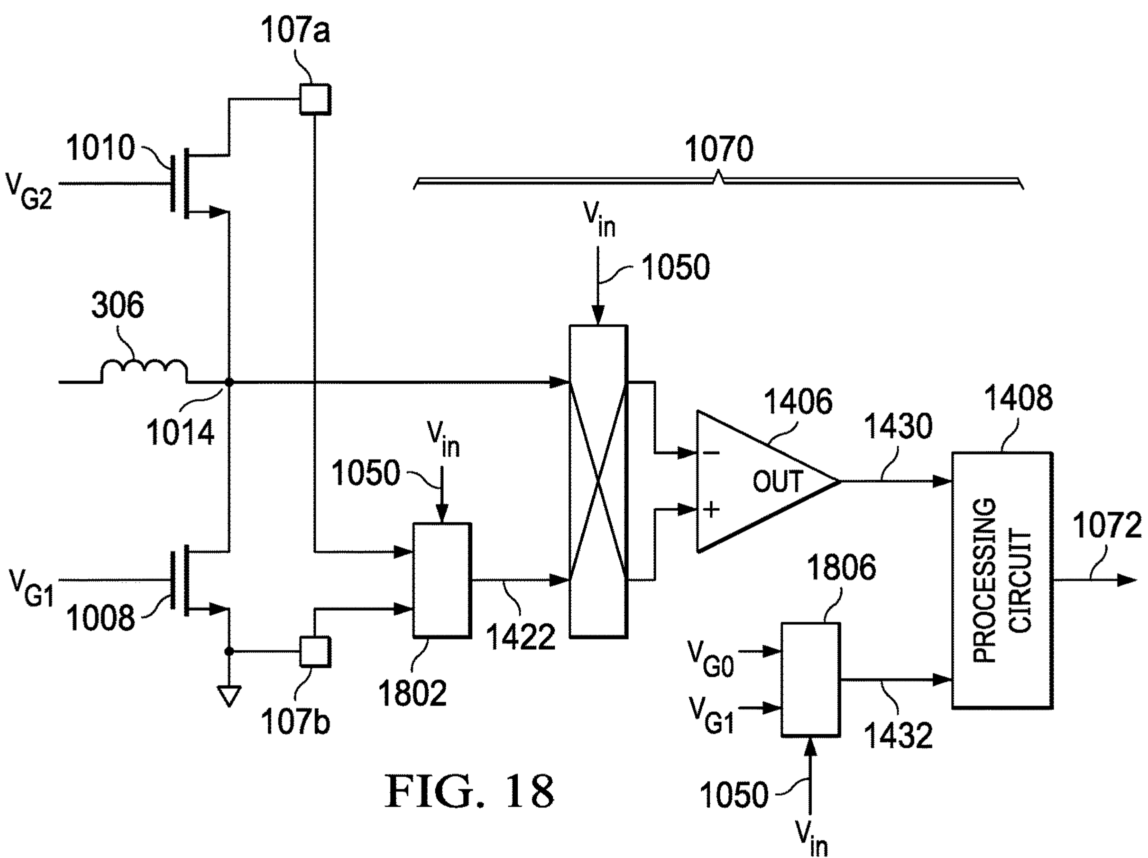

FIG. 18 illustrates another example of transition measurement circuit 1070 for power converter circuit 122 of FIG. 10 where switches 1008 and 1010 are configured as a totem pole boost converter. Referring to FIG. 18, transition measurement circuit 1070 can include, in addition to comparator 1406 and processing circuit 1408, a threshold selection circuit 1802, a signal routing circuit 1804, and a control signal selection circuit 1806. Each of threshold selection circuit 1802, signal routing circuit 1804, and control signal selection circuit 1806 can receive measurements 1050 of AC input voltage signal 108 ($V_{in}$). Threshold selection circuit 1802 can be coupled to positive output 107*a* and negative output 107*b*. Based on whether the system operates in the positive or negative half-cycle of the AC input voltage, threshold selection circuit 1802 can forward the positive power supply rail voltage ($V_{out}$) or the negative power supply rail voltage (ground) as threshold signal 1422 to comparator 1406. Also, signal routing circuit 1804 can forward the voltage of switching node 1014 and threshold signal 1422 to comparator 1406 to generate decision signal 1430, and can switch the polarity of comparison based on whether the system operates in the positive or negative half-cycle of the AC input voltage. Further, control signal selection circuit 1806 can selectively forward one of control signals $V_{G1}$ or $V_{G2}$ as control signal 1432 to processing circuit 1408 based on whether the system operates in the positive or negative half-cycle of the AC input voltage.

Specifically, when the system operates in the positive half-cycle of the AC input voltage, switch 1008 operates as the main switch, and ZVS condition is achieved if switching node 1014 transitions to ground when $V_{G1}$ goes high to enable switch 1008. To detect whether ZVS condition is achieved, threshold selection circuit 1802 can forward the negative power supply rail voltage (ground) as threshold signal 1422. Signal routing circuit 1804 can forward the voltage of switching node 1014 to the negative input of comparator 1406 and the ground threshold signal 1422 to the positive input of comparator 1406. Comparator 1406 can generate a logical one decision signal 1430 if the voltage of switching node 1014 is equal to or below ground, and generate a logical zero decision signal 1430 if the voltage of switching node 1014 is above ground. Control signal selection circuit 1806 can forward control signal $V_{G1}$ for switch 1008 to processing circuit 1408. If comparator 1406 provides a logical one decision signal 1430, processing circuit 1408 can generate a pulse as indication signal 1072 when $V_{G1}$ changes state.

Also, when the system operates in the negative half-cycle of the AC input voltage, switch 1010 operates as the SR switch, switch 1010 operates as the main switch, and ZVS condition is achieved if switching node 1014 transitions to $V_{out}$ when $V_{G2}$ goes high to enable switch 1010. To detect whether ZVS condition is achieved, threshold selection circuit 1802 can forward the positive power supply rail voltage ($V_{out}$) as threshold signal 1422. Signal routing circuit 1804 can forward the voltage of switching node 1014 to the positive input of comparator 1406 and threshold signal 1422 ($V_{out}$) to the negative input of comparator 1406. Comparator 1406 can generate a logical one decision signal 1430 if the voltage of switching node 1014 is higher than or equal to $V_{out}$, and generate a logical zero decision signal 1430 if the voltage of switching node 1014 is below $V_{out}$. Control signal selection circuit 1806 can forward control signal $V_{G2}$ for switch 1010 to processing circuit 1408. If comparator 1406 provides a logical one decision signal 1430, processing circuit 1408 can generate a pulse as indication signal 1072 when $V_{G2}$ changes state.

Figure 19:
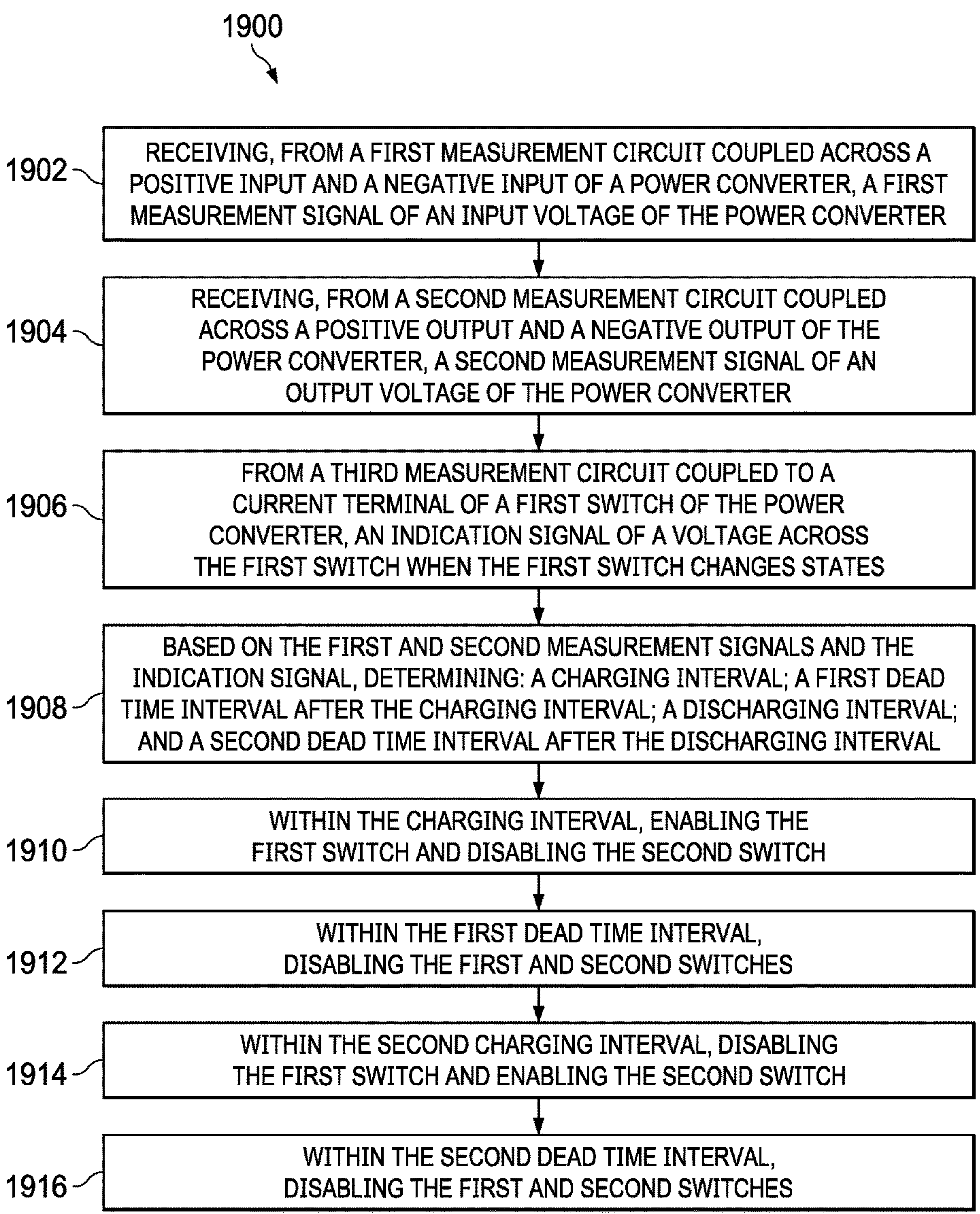
FIG. 19 is a flowchart that illustrates an example method of controlling a power converter, in various examples.

FIG. 19 includes a flowchart of an example method 1900 of controlling a power converter circuit, such as power converter circuit 122 of FIGS. 3, 6, and 10. For example, method 1900 can be performed by controller 1012. The power converter circuit can include an inductor (e.g., inductor 306), a first switch (e.g., one of switches 308, 602/604, or 1008), and a second switch (e.g., one of switches 310, 604/602, or 1010). The inductor and first and second switches can be coupled at a switching node (e.g., one of switching nodes 314, 614, or 1014), and the first and second switches can be coupled in series between a positive output and a negative output of the power converter. The first switch can operate as the main switch and the second switch can operate as the SR switch.

The power converter can be part of a power supply system (e.g., power supply system 104) that further includes a first measurement circuit (e.g., one of measurement circuits 352, 662, or 1052) coupled across the positive input and the negative input to measure the input voltage to the power converter and a second measurement circuit (e.g., one of measurement circuits 342, 652, or 1042) to measure the output voltage of the power converter. The power supply system 104 can also include a third measurement circuit (e.g., transition measurement circuit 1070) to measure a status of transition of the switching node voltage. Examples of the transition measurement circuit 1070 are shown in FIGS. 14 through 18. In some examples, the third measurement circuit can be coupled to first and second current terminals of one of the first or second switches, as shown in FIG. 14. In some examples, the third measurement circuit can be coupled to first and second current terminals of both of the first or second switches, as shown in FIG. 17. In some examples, the third measurement circuit can be coupled to the switching node, as shown in FIG. 18.

In step 1902, the controller receives, from the first measurement circuit, a first measurement of an input voltage to the power converter. The first measurement can include a digital value generated by an ADC of the first measurement circuit, and the first measurement can indicate the magnitude and polarities of the input voltage of a current switching cycle.

In step 1904, the controller receives, from the second measurement circuit, a second measurement of the output voltage to the power converter. The second measurement can include a digital value generated by an ADC of the second measurement circuit, and the second measurement can indicate the magnitude of the output voltage.

In step 1906, the controller receives, from the third measurement circuit coupled to a current terminal of a first switch of the power converter, a current terminal of a second switch of the power converter, and an inductor of the power converter, an indication signal of a voltage across the first switch when the first switch changes states. The indication signal can indicate whether the voltage completes transition to a target voltage (e.g., ground, the output voltage), such that the voltage difference across the main switch (first or second switches) is zero or below zero when the main switch changes state. In some examples, the controller can receive the indication signal right before the current switching cycle starts, as shown in FIG. 11. In some examples, the controller can receive the indication signal from a prior cycle that is not immediately before the current switching cycle.

In step 1908, the controller can determine, based on the first and second measurements and the indication signal, determining a charging interval of a switching cycle in which the inductor is charged and a discharging interval of the switching cycle in which the inductor is discharged, the switching cycle also including first and second dead time intervals, with the first dead time interval between the charging interval and the discharging interval, and the second dead time interval between the discharging interval of the current switching cycle and the charging interval of the next switching cycle.

Specifically, the controller can determine the duration of the raw charging interval $t_{M\_raw}$ based on one of Equations 7 or 8, depending on whether the output voltage exceeds half of the input voltage. The controller can also determine the duration of raw discharging interval $t_{SR\_raw}$ based on the raw charging interval and Equation 9. The controller can also determine an adjustment value $t_{adj}$ for the current switching cycle (e.g., $t_{adj}(k)$ for the $k^{th}$ cycle) based on the adjustment value of the prior cycle for which the indication signal is received (e.g., $tad_j(k-1)$ for the (k−1)th cycle, and add the adjustment value to raw discharging interval $t_{SR\_raw}$ to obtain the actual discharging interval $t_{SR}$. The controller can determine the $t_{adj}(k)$ by subtracting an offset $T_S$ from $tad_j(k-1)$ if the indication signal indicates that the voltage of the switching node completes transition before the end of the second resonant interval of the prior switching cycle, and can determine the $t_{adj}(k)$ by adding the offset $T_S$ to $tad_j(k-1)$ if the indication signal indicates that the voltage of the switching node does not complete transition before the end of the second resonant interval of the prior switching cycle. The offset $T_S$ can be constant or variable within the line cycle of the AC input voltage (and across the different switching cycles), as described above.

In some examples, the controller can provide the raw charging interval $t_{M\_raw}$ as the actual charging interval $t_M$. In some examples, the controller can also determine the actual turn-on interval $t_M$ by computing an adjustment value $t_{M\_SR}$ based on $t_{SR}$, and adding $t_{M\_SR}$ to $t_{M\_raw}$ to obtain $t_M$ based on Equations 14-21. The adjustment can provide additional time to ramp up the inductor current from the SR turn-off current provided by the discharge of the inductor during the discharging interval, to reduce distortion and improve correlation between the input current and the AC input voltage.

In some examples, the durations of the first dead time interval ($t_{dt1}$) and the second dead time interval ($t_{dt2}$) can be constant within a cycle of the AC input voltage (and across the different switching cycles). The durations can be defined, such as by programming values stored in the memory of the controller.

In some examples, referring to FIG. 13A, the controller can also determine whether a blanking condition is reached, and can operate first and second switches in a switching mode if the system does not operate in the blanking condition. If the blanking condition is reached, the controller can operate first and second switches in a blanking mode where both first and second switches are disabled. The blanking condition can be reached when the AC input voltage is close to zero. The controller can determine whether the blanking condition is reached, such as based on whether a total switching period (based on $t_{M\_raw}$, $t_{SR\_raw}$, $t_{dt1}$, and $t_{dt2}$) is below a threshold duration, or whether the magnitude of the AC input voltage is below a threshold voltage. By disabling the switches under the blanking condition, spikes in the input current can be avoided, which can also reduce distortion and improve correlation between the input current and the AC input voltage.

If the controller determines to operate in the switching mode, the controller can proceed to steps 1910-1916. The controller can include a PWM generator (e.g., PWM generator circuit 1214) to generate a sequence of control signals (e.g., $V_M$ and $V_{SR}$ in FIG. 3, $V_{G1}$ and $V_{G2}$ in FIG. 6 and FIG. 10) to enable/disable the first and second switches based on the timing defined by $t_M$, $t_{SR}$, $t_{dt1}$, and $t_{dt2}$. In some examples, the controller can implement a state machine that operates according to the example state diagram 1350 of FIG. 13B.

In step 1910, within the charging interval, the controller can enable the first switch and disable the second switch to charge the inductor with the input current, and the inductor current increases to reach a peak current at the end of the charging interval. The controller can set a first control signal at a first state (e.g., a gate voltage higher than the source voltage by a conduction threshold of an NFET of the first switch) to enable the first switch, and set a second control signal at a second state (e.g., a gate voltage below a sum of the source voltage and the conduction threshold of an NFET of the second switch) to disable the second switch.

In step 1912, within the first dead time interval after the charging interval, the controller can disable both the first and second switches. The controller can set both the first control signal and the second control signal at the second state to disable both the first and second switches. In some examples, the first dead time interval duration can be identical to the first resonant interval ($t_{res1}$), in which the inductor and the capacitances of the first and second switches form a resonant system, and the voltage of the switching node can transition to a first voltage (e.g., the output voltage, ground) as the peak inductor current charges the parasitic capacitance of the main switch and discharges the parasitic capacitance of the SR switch.

In step 1914, within the discharging interval after the first resonant interval, the controller can disable the first switch and enable the second switch to discharge the inductor to provide an output current to the load, and the inductor current drops from the peak current to a SR turn-off current when the discharging interval ends. The SR turn-off current can be zero or a negative current. The controller can set the first control signal at the second state to disable the first switch, and set the second control signal at the first state to enable the second switch.

In step 1916, within the second dead time interval after the discharging interval, the controller can set both the first control signal and the second control signal at the second state to disable both the first and second switches. In some examples, the second dead time interval duration can be identical to the second resonant interval ($t_{res2}$) in which the SR turn-off current can discharge the parasitic capacitance of the main switch and charge the parasitic capacitance of the SR switch. The voltage of the switching node can transition to a second voltage (e.g., ground, the output voltage) by the end of second resonant interval.

Figure 20:
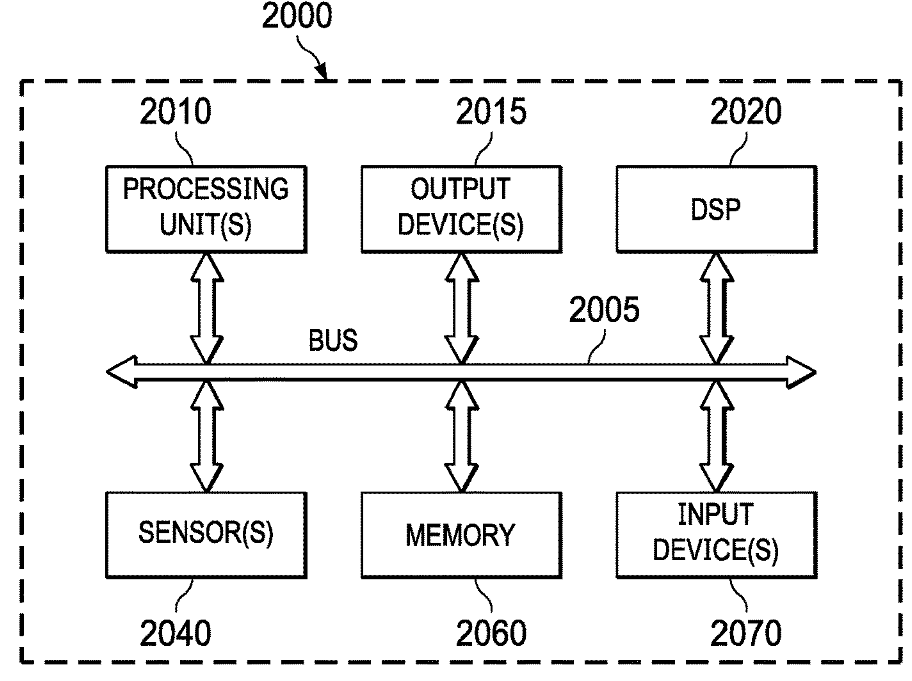
FIG. 20 is a schematic diagram that illustrates an example hardware system that be part of the example power supply system of FIGS. 1 through 18.

FIG. 20 illustrates an embodiment of a hardware system 2000, which may be used as described herein above. For example, hardware system 2000 is useful to perform one or more of the functions of method 1900 of FIG. 19 and can implement the functions of controller 1012. FIG. 20 provides only a generalized illustration of various components, any or all of which may be used as appropriate.

Hardware system 2000 is shown comprising hardware elements that can be electrically coupled via a bus 2005 (or may otherwise be in communication, as appropriate). The hardware elements may include a processing unit(s) 2010 which can include without limitation one or more general-purpose processors, one or more special-purpose processors (such as digital signal processing (DSP) chips, graphics acceleration processors, application specific integrated circuits (ASICs), and/or the like), and/or other processing structure or means. For example, processing unit(s) 2010 can perform computations according to Equations 7-21 as described above. As shown in FIG. 20, some embodiments may have a separate Digital Signal Processor (DSP) 2020, depending on desired functionality. For example, DSP 2020 can process measurement 1040 of the output voltage and measurement 1050 of the input voltage of power converter circuit 122. In some examples, hardware system 2000 can include one or more input devices 2070, which can include devices related to user interface (e.g., a touch screen, touch pad, microphone, button(s), dial(s), switch(es), and/or the like). For example, input devices 2070 can provide various programming values for the durations of the first and second resonant intervals ($t_{res1}$ and $t_{res2}$) and reference current $I_{ref}$. Similarly, the one or more output devices 2015 may be related to interacting with a user (e.g., via a display, light emitting diode(s) (LED(s)), speaker(s)). Hardware system 2000 can further include sensor(s) 2040. For example, sensor(s) 2040 can include various components of transition measurement circuit 1070.

Hardware system 2000 may further include and/or be in communication with a memory 2060. Memory 2060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

In some examples, memory 2060 may provide memory 1220 of FIG. 12 to provide storage to support the computations according to Equations 7-21. Memory 2060 can also include software elements (not shown in FIG. 20), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 2060 that are executable by hardware system 2000 (and/or processing unit(s) 2010 or DSP 2020 within hardware system 2000). In an aspect, then, such code and/or instructions can be used to configure and/or adapt a general purpose computer (or other device) to perform one or more operations in the described methods.

With reference to the drawings, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including non-volatile media, volatile media, and transmission media. Example forms of computer-readable media include magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

Aspects of embodiments herein can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked.

Any of the software components or functions described in this application may be implemented as software code to be executed by a processor using any suitable computer language, such as Java, C, C++, C#, Objective-C, Swift, or scripting language (e.g., Perl or Python) using conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computing system), and may be present on or within different computer products within a system or network. A computing system may include a monitor, printer, or other suitable display for providing any of the results mentioned herein to a user.

Any of the methods described herein may be totally or partially performed with a computing system including one or more processors, which can be configured to perform the steps. Thus, embodiments can be directed to computing systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described herein as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

Certain components may be described herein as being of a particular process technology, but these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor.

Uses of the phrase "ground voltage potential" in this description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described examples, and other examples are possible, within the scope of the claims.

What is claimed is:

1. An apparatus comprising:

a controller circuit having a first control input, a second control input, a third control input, a control output, in which the controller circuit is configurable to:

at the control output, provide a control signal;

at the first control input, receive a first signal representing a power converter input voltage;

at the second control input, receive a second signal representing a power converter output voltage;

at the third control input, receive a third signal indicating whether a voltage across a switch is zero when the control signal switches states;

responsive to the first, second, and third signals, adjust a timing of the control signal; and at the control output, provide the control signal having the adjusted timing.

2. The apparatus of claim 1, wherein:

the switch is a first switch having a first control terminal;

the control signal is a first control signal;

the control output is coupled to the first control terminal of the first switch;

the controller circuit has a second control output coupled to a second control terminal of a second switch, and the controller circuit is configurable to:

at the second control output, provide a second control signal;

responsive to the first, second, and third signals, adjust a timing of the second control signal; and at the second control output, provide the second control signal having the adjusted timing.

3. The apparatus of claim 1, wherein a switching cycle of the control signal includes a charging interval; a first dead time interval after the charging interval; a discharging interval; and a second dead time interval after the discharging interval; and wherein the controller circuit is configurable to:

increase the discharging interval responsive to the third signal indicating that the voltage is non-zero when the control signal switches states; and decrease the discharging interval responsive to the third signal indicating that the voltage is zero when the control signal switches states.

4. The apparatus of claim 3, wherein the controller circuit is configurable to:

determine a first duration value responsive to the first and second signals;

determine an adjustment value responsive to the third signal; and determine a duration of the discharging interval based on the adjustment value to the first duration value.

5. The apparatus of claim 4, wherein:

the switching cycle is a first switching cycle;

the adjustment value is a first adjustment value; and the controller circuit is configurable to:

receive a second adjustment value for a second switching cycle prior to the first switching cycle; and responsive to the third signal, determine the first adjustment value based on adding an offset to the second adjustment value; or subtracting the offset from the second adjustment value.

6. The apparatus of claim 5, wherein:

the offset is a first offset; and the controller circuit is configurable to:

receive a second offset for the second switching cycle;

responsive to the third signal indicating that the voltage is non-zero when the control signal switches states, and responsive to the second adjustment value being generated by adding the second offset, determine the first offset by increasing the second offset; and determine the first adjustment value by adding the first offset to the second adjustment value.

7. The apparatus of claim 4, wherein the controller circuit has a fourth control input and is configurable to:

receive, at the fourth control input, a fourth signal of a power converter input current;

determine a second duration value responsive to the fourth signal; and determine a duration of the charging interval based on the second duration value.

8. The apparatus of claim 7, wherein the duration of the charging interval equals the second duration value.

9. The apparatus of claim 7, wherein the controller circuit is configurable to:

determine the second duration value based on the first duration value and the first and second signals;

determine an extension interval value based on the first duration value; and determine the duration of the charging interval based on adding the extension interval value to the second duration value.

10. The apparatus of claim 9, wherein the first duration value corresponds to a first duration in which a charging current increases from zero to a target peak current based on the power converter input voltage; and wherein the extension interval value corresponds to a second duration in which a discharging current increases from a negative value to zero, the negative value being based on the second duration value.

11. The apparatus of claim 1, wherein a switching cycle of the control signal includes a charging interval; a first dead time interval after the charging interval; a discharging interval; and a second dead time interval after the discharging interval; and wherein the controller circuit is configurable to set at least one of the first or second dead time interval to a constant duration across multiple switching cycles, and adjust at least one of the charging interval or the discharging interval responsive to the first, second, and third signals with the at least one of the first or second dead time interval set to the constant duration.

12. The apparatus of claim 1, wherein the controller circuit is configurable to:

determine a power converter switching cycle period; and responsive to the power converter switching cycle period exceeding a threshold duration, set a state of the control signal to disable the switch.

13. The apparatus of claim 1, wherein a switching cycle of the control signal includes a charging interval; a first dead time interval after the charging interval; a discharging interval; and a second dead time interval after the discharging interval; and wherein the third signal is responsive to the voltage of the switch at a beginning of the charging interval.

14. The apparatus of claim 1, wherein a switching cycle of the control signal includes a charging interval; a first dead time interval after the charging interval; a discharging interval; and a second dead time interval after the discharging interval; and wherein the third signal is responsive to a state of the switch at least one power converter switching cycle prior to the charging interval.

15. The apparatus of claim 1, wherein the voltage is a first voltage, and the apparatus further comprises a detection circuit, the measurement circuit having a first input, a second input, and an output coupled to the third control input, the detection circuit configurable to:

receive a fourth signal at the first input representing a second voltage at a current terminal of the switch;

receive the control signal at the second input; determine the first voltage across the switch based on the second voltage;

detect a change of state of the control signal; and provide the third signal at the output responsive to the first voltage and detection of the change of state of the control signal.

16. The apparatus of claim 15, wherein the measurement circuit includes:

a voltage sensing circuit configurable to generate a fifth signal responsive to the fourth signal;

a comparator configurable to generate a sixth signal responsive to a comparison between the fifth signal and a threshold; and a pulse generator configurable to:

generate a pulse signal responsive to the sixth signal, and responsive to a change of state of the first control signal; and provide the third signal responsive to the pulse signal.

17. The apparatus of claim 15, wherein:

the power converter input voltage is part of an alternating current (AC) voltage signal;

the switch is a first switch having a first control terminal;

the voltage is a first voltage; and the detection circuit has:

a third input coupled to a second switch having a second control terminal and includes:

a first measurement sub-circuit configurable to generate a fifth signal indicating whether the first voltage is zero when the first control terminal switches states;

a second measurement sub-circuit configurable to, responsive to a state of the third input, generate a sixth signal indicating whether a second voltage across the second switch is zero when the second control terminal switches states; and a signal selection circuit configurable to forward one of the fifth signal or the sixth signal as the third signal to the output of the detection circuit responsive to an indication of whether the power converter input voltage is in a positive half-cycle or a negative half-cycle of the AC voltage signal.

18. The apparatus of claim 1, wherein the third signal is based on the voltage across the switch.

19. A method comprising:

providing a control signal to a switch of a power converter;

receiving a first signal indicative of an input voltage to the power converter;

receiving a second signal indicative of an output voltage of the power converter;

receiving a third signal indicative of whether a voltage across a switch of the power converter is zero when the control signal changes states;

adjusting a timing of the control signal responsive to the first, second, and third signals; and providing the control signal having the adjusted timing to the switch.

20. The method of claim 19, wherein a switching cycle of the control signal includes a charging interval; a first dead time interval after the charging interval; a discharging interval; and a second dead time interval after the discharging interval; and adjusting a timing of the control signal responsive to the first, second, and third signals includes setting at least one of the first or second dead time interval of the control signal to a constant duration across multiple switching cycles, and adjusting at least one of the charging interval or the discharging interval of the control signal responsive to the first, second, and third signals with the at least one of the first or second dead time interval of the control signal set to the constant duration.

21. The method of claim 19, wherein the third signal is based on the voltage across the switch.

22. An apparatus comprising:

a power converter having a positive input, a negative input, a positive output, and a negative output, the power converter including a first switch, a second switch, and an inductor, the first switch and the second switch coupled in series between the positive and negative outputs, and a first current terminal of the first switch coupled to a second current terminal of the second switch and the inductor, the first switch having a first control terminal, and the second switch having a second control terminal;

a first circuit having a first input, a second input, and a first output, the first and second inputs coupled to, respectively, the positive and negative inputs of the power converter, and the first circuit configurable to provide, at the first output, a first signal representing an input voltage to the power converter;

a second circuit having a third input, a fourth input, and a second output, the third and fourth inputs coupled to, respectively, the positive and negative outputs of the power converter, and the second circuit configurable to provide, at the second output, a second signal representing an output voltage to the power converter;

a third circuit having a fifth input, a sixth input, a seventh input, and a third output, the fifth input and the seventh input coupled across the first switch, the sixth input coupled to the first control terminal of the first switch and to the second control terminal of the second switch, and the third circuit configurable to provide, at the third output, a third signal indicating whether whether a voltage across the first switch is zero when the first control terminal switches states or whether a voltage across the second switch is zero when the second control terminal switches states; and a controller circuit having a first control input, a second control input, a third control input, a first control output, and a second control output, the first control input coupled to the first output, the second control input coupled to the second output, the third control input coupled to the third output, the first control output coupled to the first control terminal of the first switch, the second control output coupled to the second control terminal of the second switch, and the controller circuit configurable to:

provide a first control signal at the first control output;

provide a second control signal at the second control output; and adjust a timing of the first control signal and a timing of the second control signal responsive to the first, second, and third signals; and provide the first control signal having the adjusted timing at the first control output; and provide the second control signal having the adjusted timing at the second control output.

23. The apparatus of claim 22, wherein a switching cycle of each of the first and second control signals includes a charging interval; a first dead time interval after the charging interval; a discharging interval; and a second dead time interval after the discharging interval;

wherein the controller circuit is cconfigurable to: set at least one of the first or second dead time interval of the first control signal to a first constant duration across multiple switching cycles, and adjust at least one of the charging interval or the discharging interval of the first control signal responsive to the first, second, and third signals with the at least one of the first or second dead time interval of the first control signal set to the first constant duration; and wherein the controller circuit is configurable to: set at least one of the first or second dead time interval of the second control signal to a second constant duration across multiple switching cycles, and adjust at least one of the charging interval or the discharging interval of the second control signal responsive to the first, second, and third signals with the at least one of the first or second dead time interval of the second control signal set to the second constant duration.

* * * * *